US009619555B2

(12) United States Patent
Anwar et al.

(10) Patent No.: US 9,619,555 B2
(45) Date of Patent: Apr. 11, 2017

(54) SYSTEM AND PROCESS FOR NATURAL LANGUAGE PROCESSING AND REPORTING

(71) Applicant: Shahbaz Anwar, Houston, TX (US)

(72) Inventors: Shahbaz Anwar, Houston, TX (US); Muhammad Kamran Malik, Wapda Town Lahore (PK); Muhammad Javed, Rahwali (PK); Faheem Abbas, Lahore (PK); Imran Saeed, Lahore (PK)

( * ) Notice: Subject to any disclaimer, the term of this patent is extended or adjusted under 35 U.S.C. 154(b) by 317 days.

(21) Appl. No.: 14/505,323

(22) Filed: Oct. 2, 2014

(65) Prior Publication Data

US 2016/0098479 A1 Apr. 7, 2016

(51) Int. Cl.
*G06F 7/04* (2006.01)
*G06F 17/30* (2006.01)
*G06F 17/27* (2006.01)

(52) U.S. Cl.
CPC .... *G06F 17/30684* (2013.01); *G06F 17/2705* (2013.01); *G06F 17/30401* (2013.01); *G06F 17/30731* (2013.01); *G06F 17/30864* (2013.01)

(58) Field of Classification Search
None
See application file for complete search history.

(56) References Cited

U.S. PATENT DOCUMENTS

| | | | |
|---|---|---|---|
| 7,505,989 B2 * | 3/2009 | Gardner | G06F 17/30734 |
| 9,396,181 B1 * | 7/2016 | Sripada | G06F 17/2881 |
| 9,501,585 B1 * | 11/2016 | Gautam | G06F 17/30991 |
| 2012/0158633 A1 * | 6/2012 | Eder | G06F 19/3437 706/46 |
| 2012/0179752 A1 * | 7/2012 | Mosley | G06Q 10/10 709/204 |
| 2014/0025703 A1 * | 1/2014 | Samuels | G06F 17/30424 707/769 |
| 2014/0188835 A1 * | 7/2014 | Zhang | G06F 17/2705 707/706 |

* cited by examiner

*Primary Examiner* — Bruce Moser
(74) *Attorney, Agent, or Firm* — John Lindsay

(57) ABSTRACT

The present invention is directed to a computerized system and process for natural language query and reporting comprising a processor, memory, and a query interface configured for receipt of a data source selection. The processor searches and retrieves over a network unstructured data based on the received data source selection, parses the unstructured data into data blocks and stores the data blocks in a local database. The processor semantically parses the data blocks and stores the resulting data in a structured database.

A report module is configured to iteratively receive keyword input and instantiate a subject node, the node representing a subset of data blocks of the structured database having the input keywords. The report module creates a taxonomy based on the input keywords, with descendant levels representing a subset of data blocks of the subject node, the subset of data blocks having the input keywords combined with other words in the data blocks. The report module further associates a keyword selector with the subject node, the keyword selector presenting an interface for additional user keyword input.

5 Claims, 29 Drawing Sheets

17 { "I recently purchased the PT730. I have owned a Norelco 5842 XL for 26 years. It has dropped down to about 1 week of use per charge from the 6 weeks it was for many years. I am only on my second set of shaving heads. I just got tired of charging it weekly. The old razor outperforms the PT730 in every way. The only advantage the new one has is that it is lighter and quieter and that is mostly due to it having a marginal motor. It has no more than half the power of the old razor. I was also surprised to find that it doesn't shave as closely as my 15 year old cutting heads. Maybe things have to wear in a bit for optimum closeness.

17 { Fortunately for me, the PT730 does an adequate job because I don't have very heavy whiskers. For those who have light to medium whiskers, this shaver will be fine. If you have manly-man stubble I would suggest looking for something with more power. If you require a very close shave, look elsewhere as well.

17 { UPDATE - I have had the razor for a month now and I feel obligated to up my rating from 3 stars to 5 stars. The heads or my face broke in after 3 or 4 days and I am now getting a very nice shave. It went 4 weeks on the first charge being used 5 days a week. I went 3 days without shaving once and when I did resume, there was no pulling or tugging at all. Very nice. I still find the motor to be weak, but it seems to do the job for me, and I really like the light weight and low noise. I would still be hesitant if you grow really heavy whiskers, but to all others I say buy this one."

Fig. 4

SYSTEM AND PROCESS FOR NATURAL LANGUAGE PROCESSING AND REPORTING

BACKGROUND

Field of the Invention

The present invention relates to natural language processing, more specifically, to interactive reporting systems based upon natural language processing.

Description of the Related Art

Organizations are in need for quick, usable intelligence in order to drive their business needs, such as market research and customer perception. Currently, a data analyst analyzes data such as consumer reviews, product reviews, and marketing data to generate reports. The final reports may contain charts, text, images and other information based on data from disparate data sources such as social media, product reviews, surveys, chat logs, contact center paper files, and other sources. The data analyst must understand the business request, interpret the request, generate a query, and generate one or more static reports.

It is the goal of the data analyst and report user to derive sufficient information in a short period of time in order to make business decisions in a minimal amount of time. Currently, the data analyst manually creates the database query, analyzes and organizes the returned dataset, and organizes the information for reporting.

Many users would prefer to initiate the process with a natural language request and interact with the results for confirmation or additional insight. It would be advantageous for the art to have system and process for receipt of a natural language request and an interactive reporting interface in response the request.

SUMMARY

The present invention is directed to a computerized system and process for natural language query and reporting comprising a processor, memory, and a query interface configured for receipt of a data source selection. The processor searches and retrieves over a network unstructured data based on the received data source selection, parses the unstructured data into data blocks and stores the data blocks in a local database. The processor semantically parses the data blocks and stores the resulting data in a structured database.

A report module is configured to iteratively receive keyword input and instantiate a subject node, the node representing a subset of data blocks of the structured database having the input keywords. The report module creates a taxonomy based on the input keywords, with descendant levels representing a subset of data blocks of the subject node, the subset of data blocks having the input keywords combined with other words in the data blocks. The report module further associates a keyword selector with the subject node, the keyword selector presenting an interface for additional user keyword input.

These and other features, aspects, and advantages of the invention will become better understood with reference to the following description, appended claims, and accompanying drawings.

BRIEF DESCRIPTION OF THE DRAWINGS

FIGS. 3a-3c show a representative unstructured data for processing by the system of FIG. 1;

FIG. 4 shows a representative extracted data blocks from the unstructured data for later processing by the system of FIG. 1;

DETAILED DESCRIPTION

While the foregoing detailed description has disclosed several embodiments of the invention, it is to be understood that the above description is illustrative only and not limiting of the disclosed invention. It will be appreciated that the discussed embodiments and other unmentioned embodiments may be within the scope of the invention.

Figure 1:
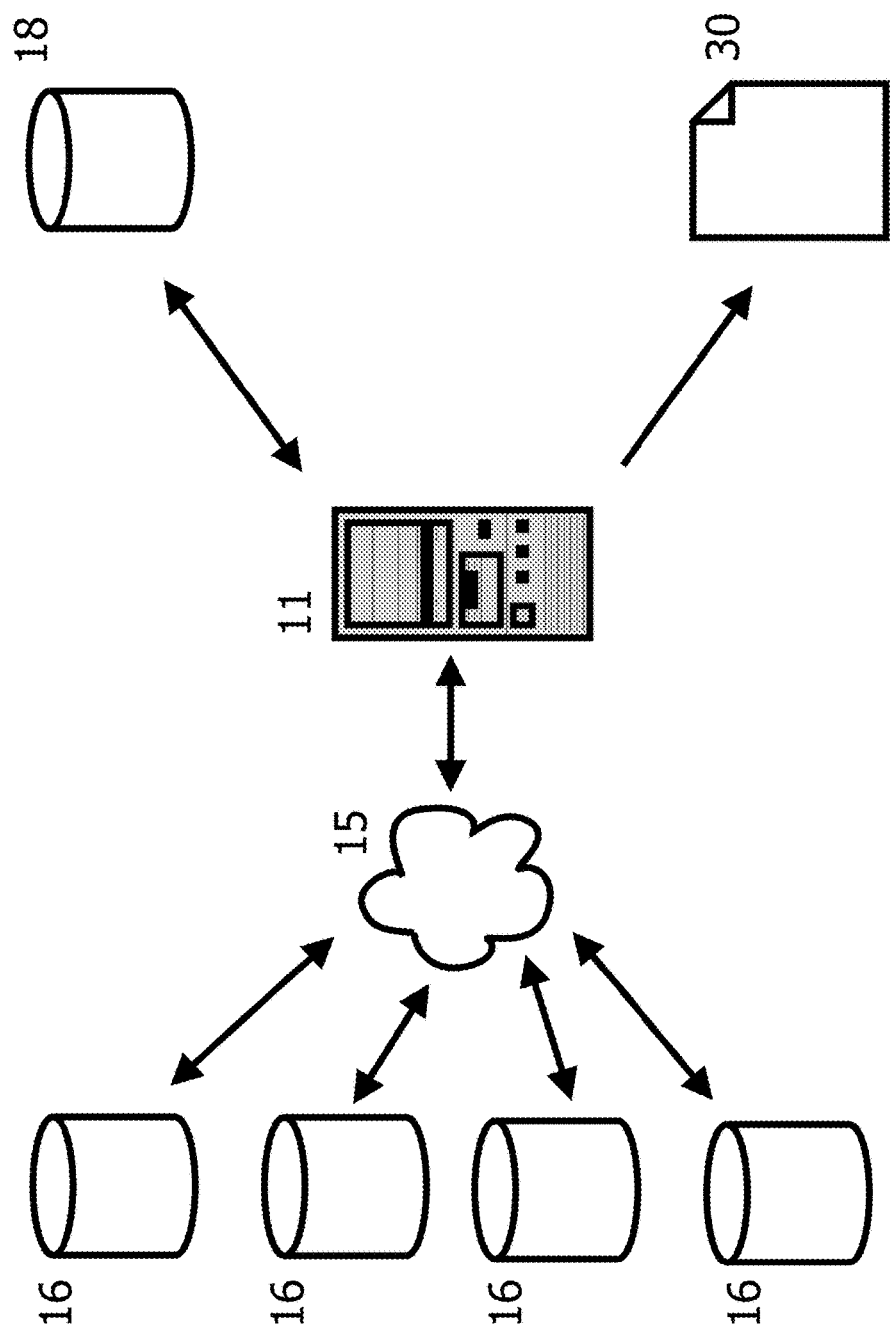
FIG. 1 shows a block diagram of an embodiment according to the current invention.

Systems and methods for receiving a natural language query and automated, interactive reporting in response to the query are disclosed. The system receives a natural language query from the user. The system retrieves unstructured data related to the user's query. The system processes the unstructured data applying natural language processing and generates an interactive report interface set in response to the user query. FIG. 1 depicts the major elements of an embodiment of a system of the current invention. Depicted are a plurality of unstructured databases 16, the system 10 including a computer 11, a structured database 18, and a report module 30.

The exemplary system 10 and process are executed on a computer 11. A computer or server generally refers to a system which includes a processor, memory, a screen, a network interface, storage, and input/output (I/O) components connected by way of a data bus. A server contains various server software programs and preferably contains application server software. Those skilled in the art will appreciate that the computer or servers can take a variety of configurations, including personal computers, hand-held devices, multi-processor systems, microprocessor-based electronics, network PCs, minicomputers, mainframe computers, and the like. Additionally, the computer may be part of a distributed computer environment where tasks are performed by local and remote processing devices that are communicatively linked. One skilled in the art can understand that the structure of and functionality associated with the aforementioned elements can be optionally partially or completely incorporated within one or the other, such as within one or more processors.

The depicted system 10 includes a local structured database 18 for receipt and processing of data blocks 17 from unstructured data 16 and as a source database for user queries. One skilled in the art would appreciate that the data 18 may reside in one or more databases, tables, or computers. Representative suitable database systems include MySQL, PostgreSQL, SQLite, Microsoft SQL Server, Oracle, dBASE, flat text, or the like. It is within the scope of the invention for the data source to include pointer to or data retrieved over a network. Population and queries to the structured database 18 will be considered in more detail below.

The report module 30 is operable for report interfacing in response to user query input 22 and structured data 18. It will be considered in more detail below.

Figure 2:
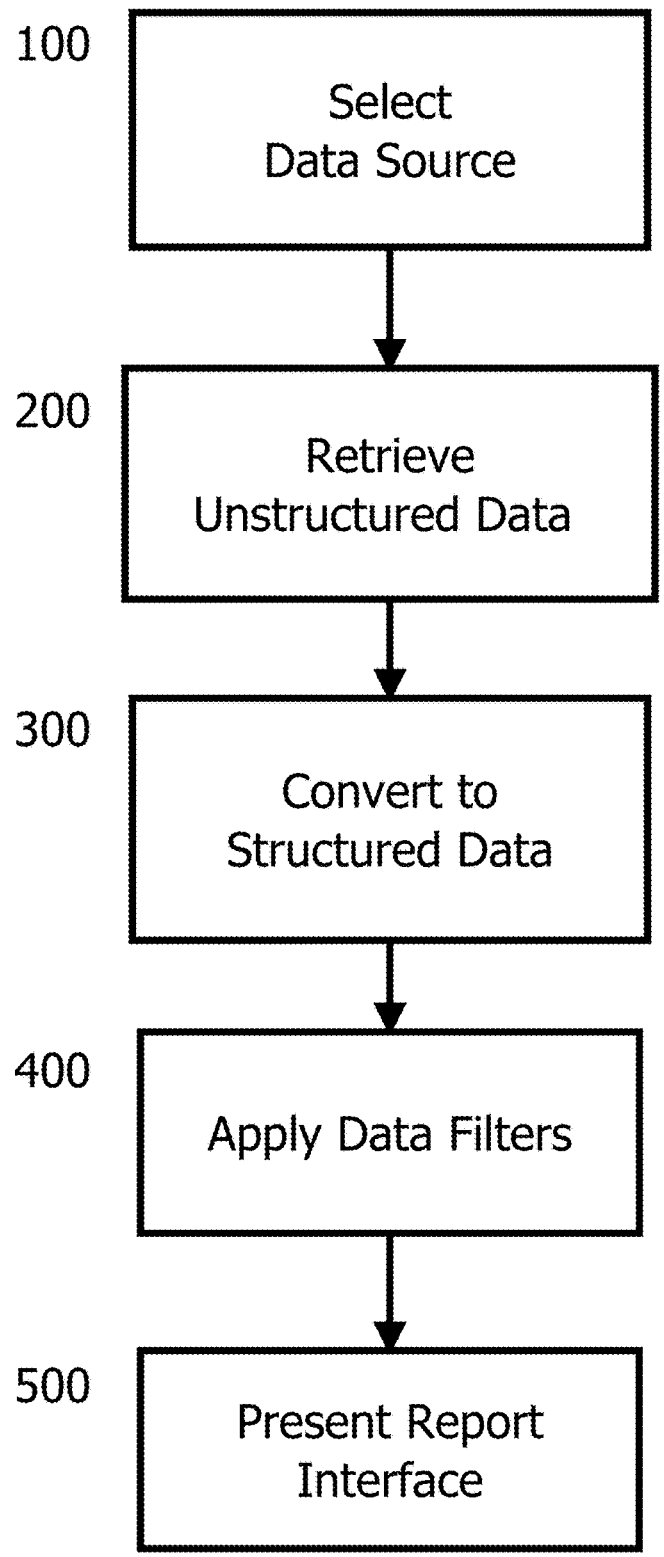
FIG. 2 shows a flowcharts for a process implemented to the embodiment of FIG. 1.

FIG. 2 depicts a process implemented to the above embodiment of the system 10. The system 10 receives a data source selection which contains unstructured data 100. The system 10 retrieves unstructured data 16 from the data source selection 200. The system 10 structures the data 16 applying natural language processing derived approaches 300. Optionally, the system 10 presents data filters to the user and narrows the structured data set in response to that input 400. The report module 30 facilitates interaction with the structured data 18, such as keyword selection and report generation 500. Each of the steps will be considered in more detail below.

Figure 3A:
Figure 3B:
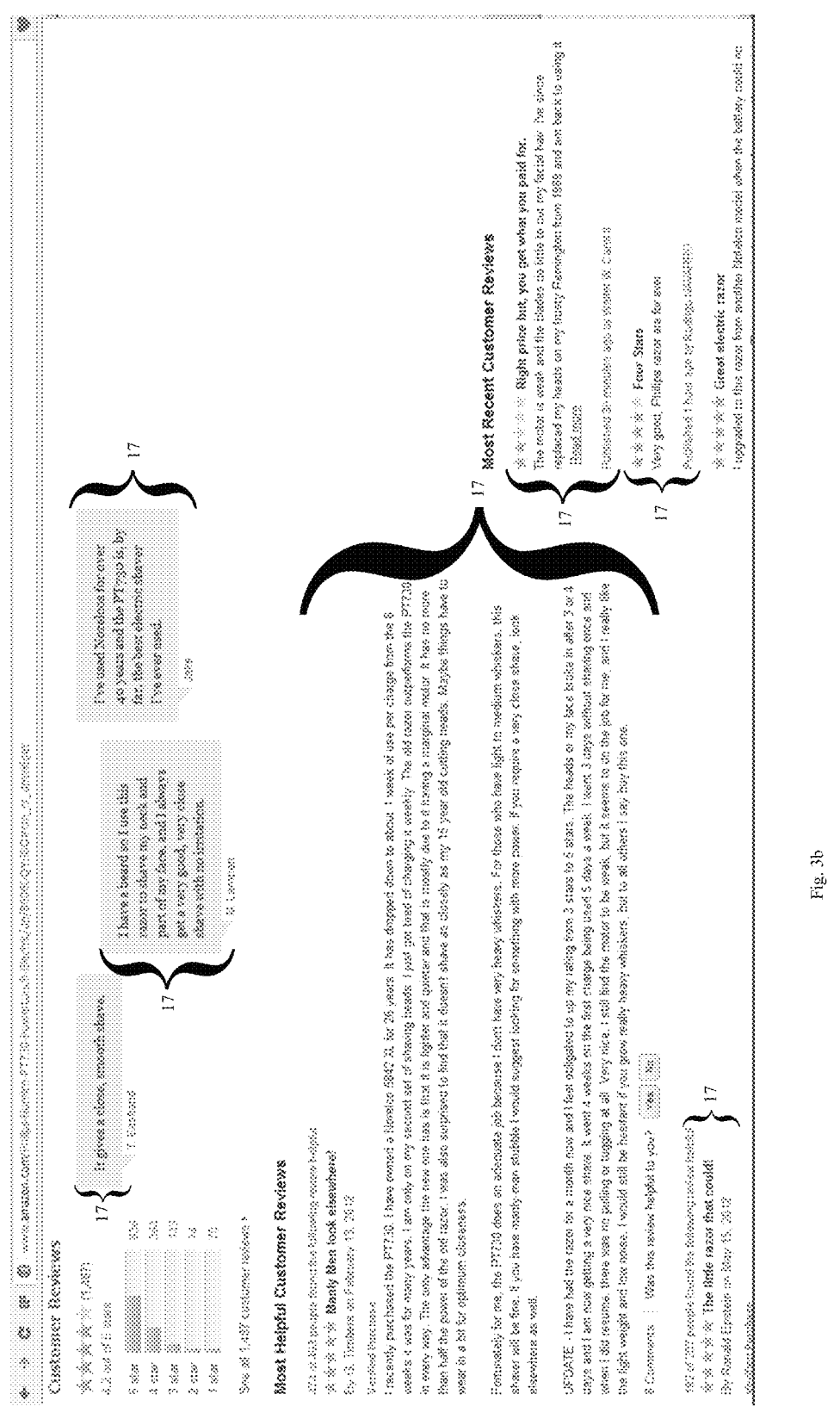
Figure 3C:

At step 100, the user inputs data sources such as call center data, newspaper articles, blogs, microblogs, one or more websites, a search engine, or other data sources. At step 200, the system 10 retrieves unstructured data from the selected data source. Representative non-exclusive unstructured databases 16 include reviews repositories, newspaper articles, call center notes, blogs, tweets, individual web pages, and other sources. The computer 11 searches the unstructured databases 16 over the network 15, the internet in exemplary process, for unstructured data 16 sources having data responsive to the query. FIGS. 3a-3c show representative unstructured databases. FIG. 3a shows a search engine as one unstructured database 16 source. FIG. 3a shows a general online product retailer with reviews as an unstructured database 16 source. FIG. 3b shows a product category specific review as an unstructured database 16 source. The data from the unstructured data 16 sources is parsed and the relevant data blocks 17, namely textual sentences and paragraphs, are extracted and stored. FIG. 4 shows representative extracted data blocks 17.

Figure 6:
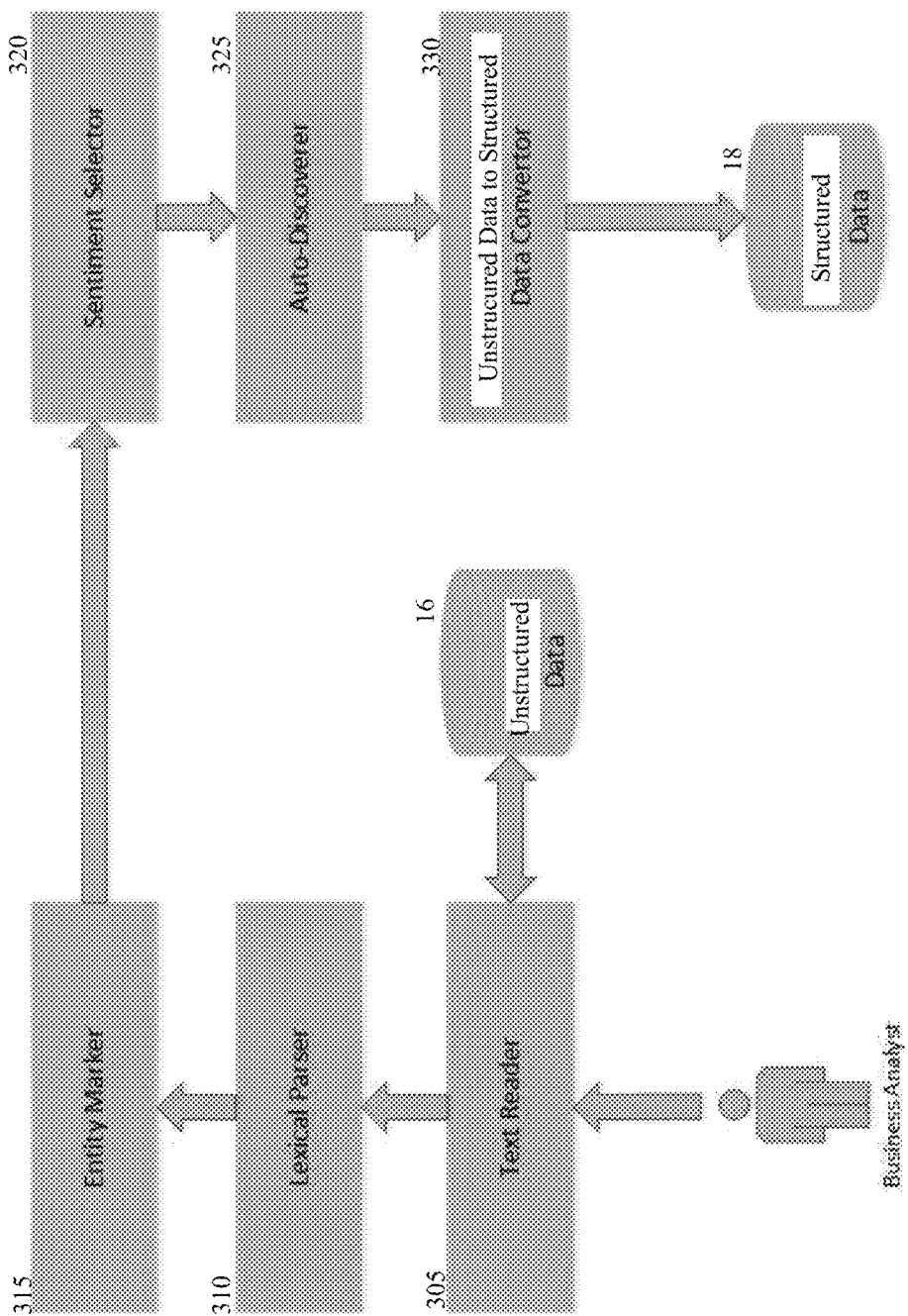
FIG. 6 shows a representative process for converting unstructured data to a structured database.

FIG. 6 depicts one process of converting the unstructured data to structured data 300. In exemplary processing, the system 10 employs natural language processing to transform the data blocks 17 of the unstructured data 16. The data blocks 17 are retrieved for processing 305. The data blocks 17 are parsed and marked for word detection and language 310 315. In one approach, the system parses data blocks 17 phrases against semantic phrases in an ontology taxonomy. A representative ontology taxonomy is WordNet, an open source "terminological ontology" containing a dictionary of words and phrases, organized by "word sense." The data block 17 words and phrases are matched a the request phrases 22 17 fragments by name against semantic phrases or their synonyms in an ontology taxonomy. In exemplary process, the system 10 parses the natural language requests as fragments of the phrases, utilizing a set of phrase handler modules that are configured to understand certain key phrase constructs, such as noun phrases, verb phrases, subject/verb/ object phrases, aggregation phrases, prepositional phrases, conjunctions, temporal phrases, geospatial phrases, persons, organizations, locations, expressions of times, quantities, monetary values, percentages, and the like. Other representative subsystems include General Architecture for Text Engineering, NETagger, OpenNLP, or Stanford CoreNLP.

In another configuration of this step 300, the system 10 employs part-of-speech tagging, that is to say marking up a word in a data block 17 as corresponding to a particular part of speech (nouns, verbs, articles, adjectives, prepositions, pronouns, adverbs, conjunctions, and interjections), based on both its definition, as well as its context i.e. its relationship with adjacent and related words in a phrase, sentence, or paragraph. For part-of-speech tagging, the system 10 can employ the above disclosed approaches or other approaches known in the art, such as the hidden Markov models, the visible Markov models, the Viterbi algorithm, the Brill tagger, constraint grammar, and the Baum-Welch algorithm.

At step 320, the system 10 associates sentiment data with the data blocks 17. The sentiment data describes the intended emotional communication of judgment or evaluation. In a product or service offering interaction, a positive, neutral, or negative sentiment are representative sentiment data values of the product, service, or aspects or features thereof. In some data blocks 17, sentiment may be directly available, for example, a data block 17 in a review context a numeric scaled rating or a visual scaled rating such as a number of stars. In other data blocks 17, the automated sentiment analysis is necessary. Representative approaches to sentiment analysis of the system 10 are keyword spotting, lexical affinity, statistical methods, and concept-level techniques. Keyword spotting classifies text by affect categories based on the presence of unambiguous affect words such as "happy," "sad," "afraid," or "bored." Lexical affinity classifies based affect words and also assigns arbitrary words a probable affinity to particular emotions. Statistical methods leverage on elements from machine learning such as latent semantic analysis, support vector machines, "bag of words" and semantic orientation. Those approaches may be supplemented the grammatical relationships of words are used. Grammatical dependency relations are obtained by further parsing of the text block 17. Representative sentiment analysis subsystems include WordNet-Affect, SentiWordNet, SenticNet, SentiBank, or others known in the art.

At step 325, auto-discovery is performed. In exemplary configuration, an in-memory representation of structured data 18 is generated which may include natural language processing, information retrieval techniques including but not limited to bag-of-words, vector space model, term-document incidence matrices or inverted index processes.

At step 330, the unstructured data to structured database 18 conversion is complete. At step 400, the data filters are presented to the user for further reduction of the structured database 18. Optionally, the user may input free form text or select additional search criteria via the text filters or structured filters. The system 10 applies the filters to reduce the resulting dataset of the structured database 18 for further processing.

Figure 7:
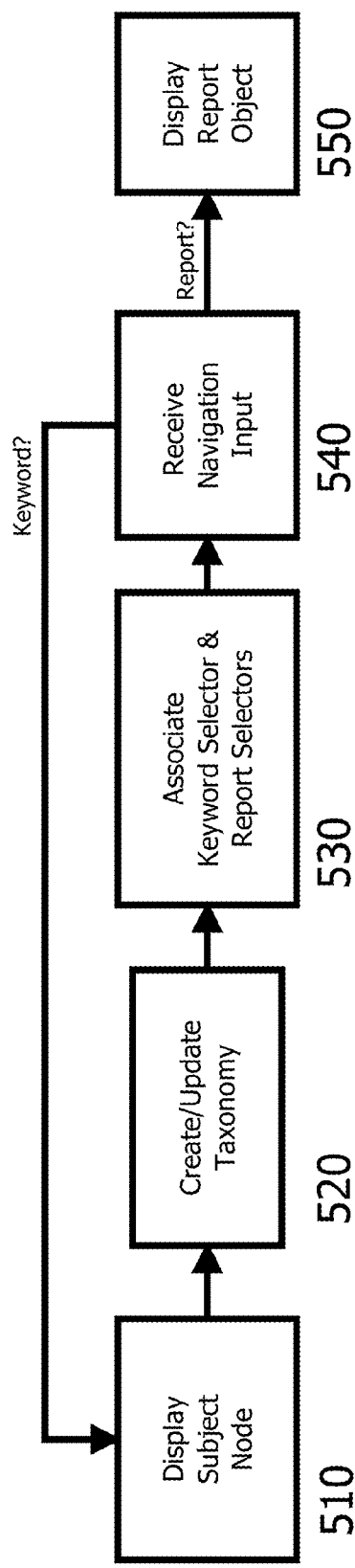
FIG. 7 shows a representative process implemented to the report module.
Figure 8:
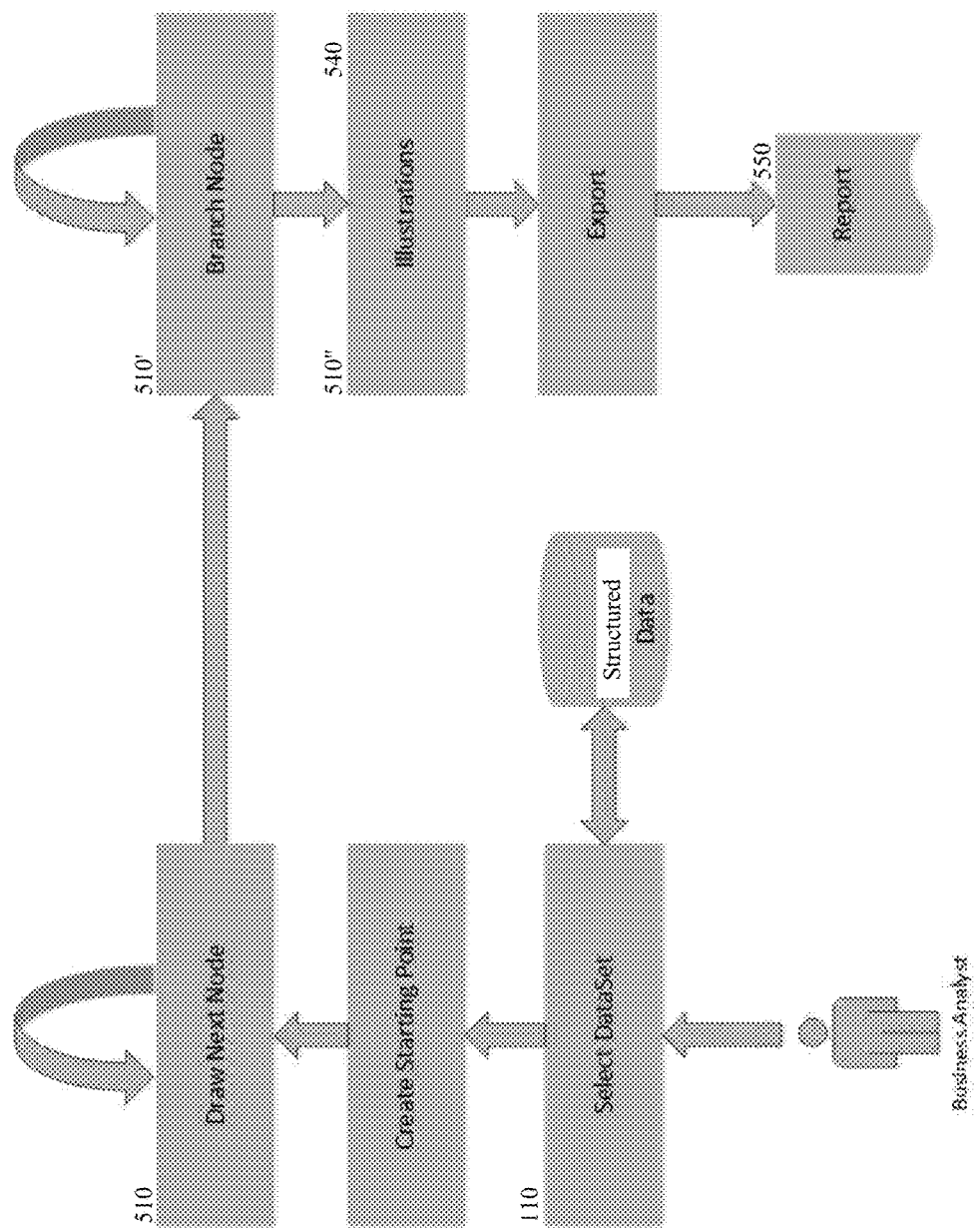
FIG. 8 shows an alternate representative process implemented to the report module.

The system includes a report module 30 which presents an interface 38 for display, interaction, reporting, and analysis to the user. FIGS. 7 and 8 depict processes deployed to the report module 30. At the starting point, a root node 34 is displayed 510. A taxonomy based on the displayed node 34 is created 520. Keyword selectors and report selectors are associated with the subject node 530. The report module receives a keyword selector or report selector selection for the subject node 540. Depending upon the selection, a report is displayed 550 or a child object is displayed as the subject node 510. More consideration will be given to each of these steps below.

At the starting point of the report module 30 interaction, the report module 30 accepts keyword input for the starting point or "root" of the reporting interaction. The root serves as the parent concept and is used as the basis to visually present and organize the relevant data from structured database 18. In one configuration, the report module 30 receives free text input. In an alternate configuration shown in FIG. 8, the input is facilitated by a list of keywords in the data blocks 17 of the structured database 18, along with the respective word count. The illustrated list restricted by part of speech and limited to nouns. The input is stored for later processing in root node 34 display.

Figure 10:
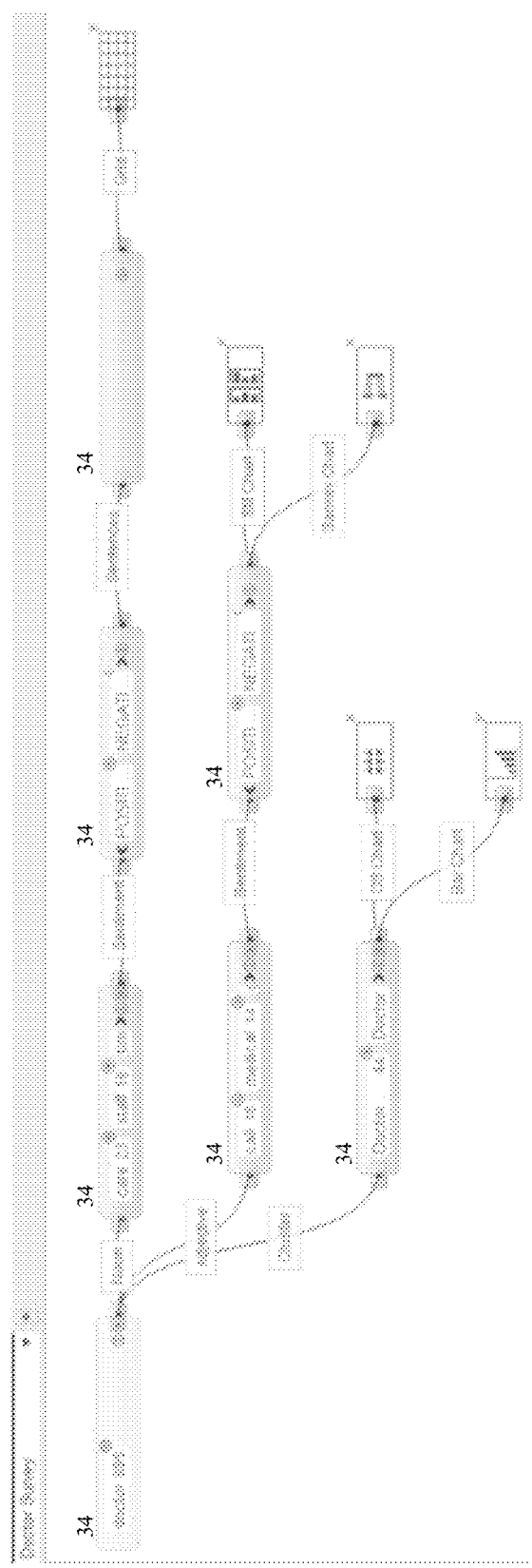
FIG. 10 shows a representative interface of the report module for node interaction.

FIG. 10 depicts a representative interface of the report module 30 for node 34 interaction. At step 510, a subject node 34 is displayed, where each node 34 represents one or more data blocks 17. Initially, it is the root node 34 representing the starting point for interaction, where the root node 34 represents the data blocks 17 containing the input initial keyword (shown as "doctor").

At step 520, a taxonomy is created or updated based on and associated with the subject node(s) 510. Now referring to FIGS. 11a and 11b, the report module 30 module applies a hierarchical relationship to the nodes 34, where deeper level child nodes 34 represent successively less data blocks 17 and the terminal node 34 represents a single data block 17. The report module 30 filters deeper level child nodes 34 further based on additional user input matches with data blocks 17 content and their associated values.

Figure 11A:
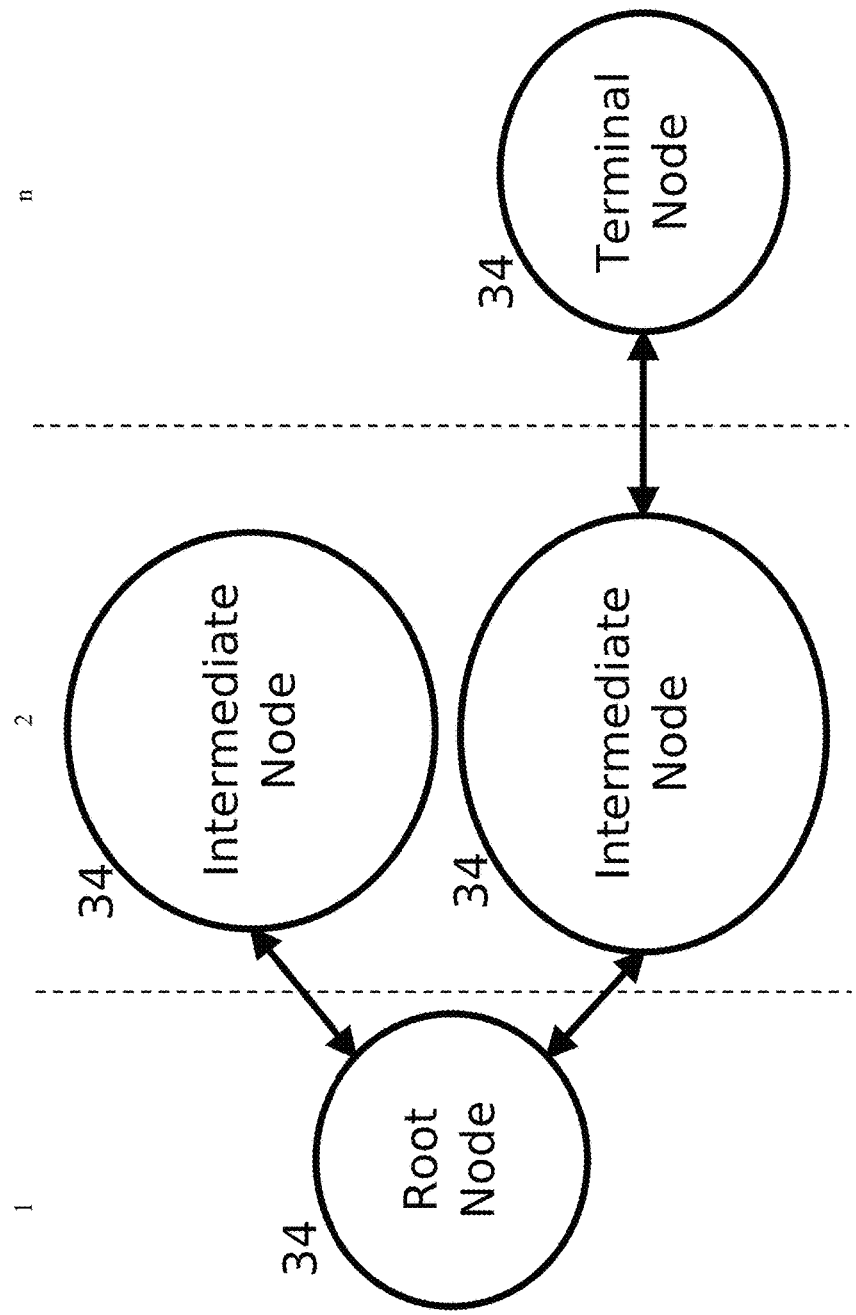
FIGS. 11a and 11b show representative data structure and types employed by the report module.

In exemplary configuration, the report module 30 applies a data tree structure of n levels to the nodes 34. In the illustrated structure, a data tree structure similar to that of FIG. 11a is applied. The root node 34 is an object representing the data blocks 17 containing the input initial keyword in exemplary configuration. The root node 34 is at the first level of the tree. The root node 34 is linked as a parent to one or more intermediate nodes 34. The intermediate nodes 34 are objects representing the data blocks 17 of the parent further restricted by additional keyword or associated values. The intermediate nodes 34 are linked as a parent to one or more intermediate nodes 34 or terminal nodes 34. The terminal nodes 34 are objects representing a single data block 17, the data block selected from the parent intermediate node 34 further restricted by additional keyword or associated values.

It should be appreciated that for computational efficiency that a complete taxonomy may not be determined at display of the subject node 34. For example, descendant nodes 34 may only be determined one level from the subject node 34, only descendant nodes 34 representing keywords above a threshold frequency may be determined, or other approaches may be used to reduce taxonomy processing.

Figure 11B:
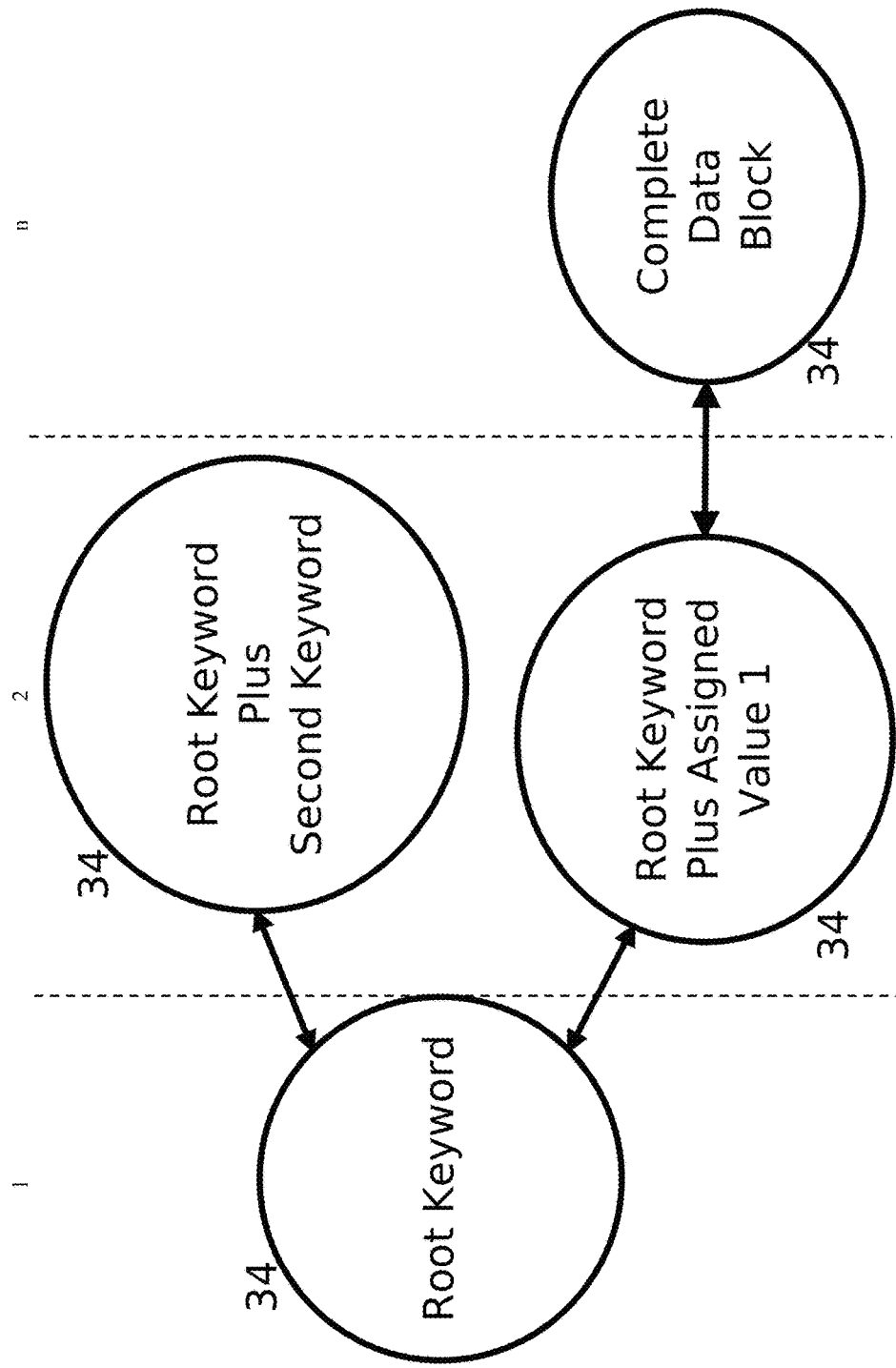

FIG. 11b depicts an example of a taxonomy applied to family of nodes 34 and data blocks 17 of a structured database 18. In response to keyword input, the root node 34, at the first level, is instantiated as an object representing the data blocks 17 containing the input initial keyword. In response to additional keyword input (disclosed below), an intermediate node 34, at the second level and descending from the root node 34, is instantiated as an object representing the data blocks 17 containing both the input initial keyword and the additional keyword input. As disclosed above, a data block 17 can have an associated assigned sentiment value such as positive, neutral, or negative. In response to additional input (disclosed below), a sibling intermediate node 34, at the second level and descending from the root node 34, is instantiated as an object representing the data blocks 17 containing both the input initial keyword and the selected sentiment value. In response to additional input (disclosed below), a terminal node 34, at the third ($n^{th}$) level and descending from an intermediate node 34, is instantiated as an object representing data blocks 17 containing both the input initial keyword and keywords of intervening intermediate nodes 34.

At step 530, keyword selectors 40 are associated with the subject node 34. FIGS. 12a-12f display various representative configurations of keyword selectors of the current embodiment. The keywords selectors 40 are interfaces to facilitate user selection of keywords and assigned values. The keyword selectors 40 parse the data blocks 17 represented by the subject node 34 and extract the different words therein. They present the extracted list of words to the user for user selection. The keyword selector 40 can also parse the data blocks 17 represented by the subject node 34 and extract the associated assigned values thereof. They present the extracted list of values to the user for user selection. In one configuration, the report module 30 present a word distance numeric input n. When input, only keywords within word distance n from the parent keyword are presented to the user for selection.

Figure 12A:
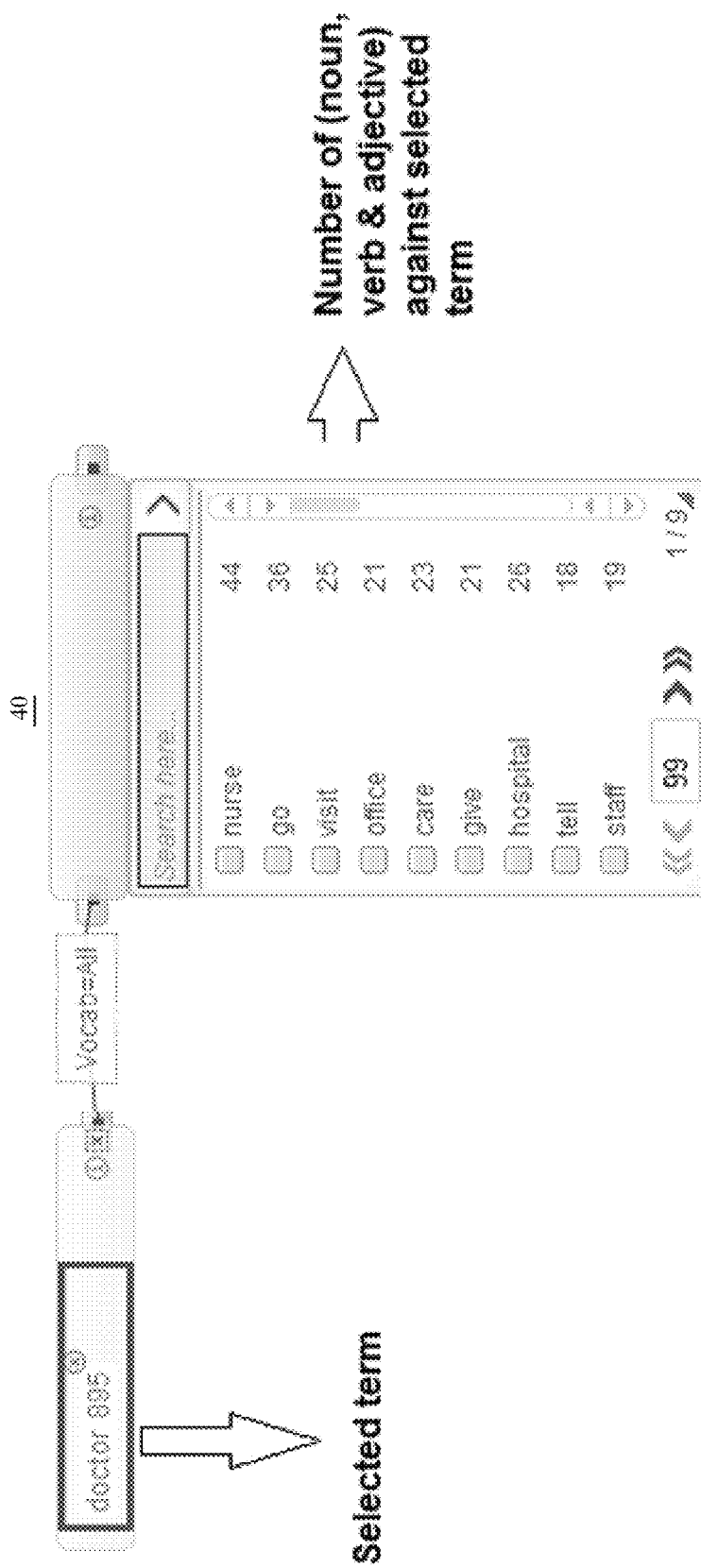
FIGS. 12a-f show representative keyword selectors of the report module.
Figure 12B:
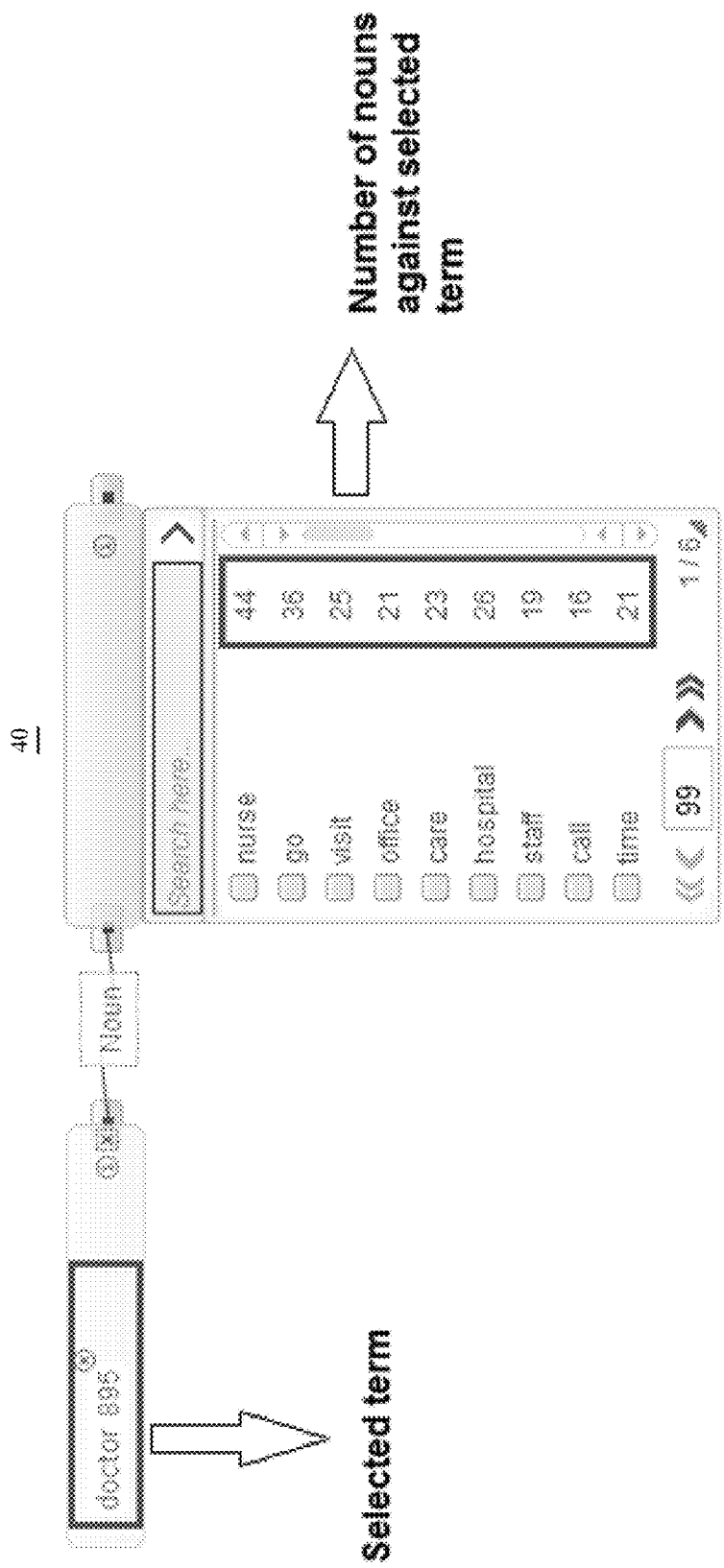
Figure 12C:
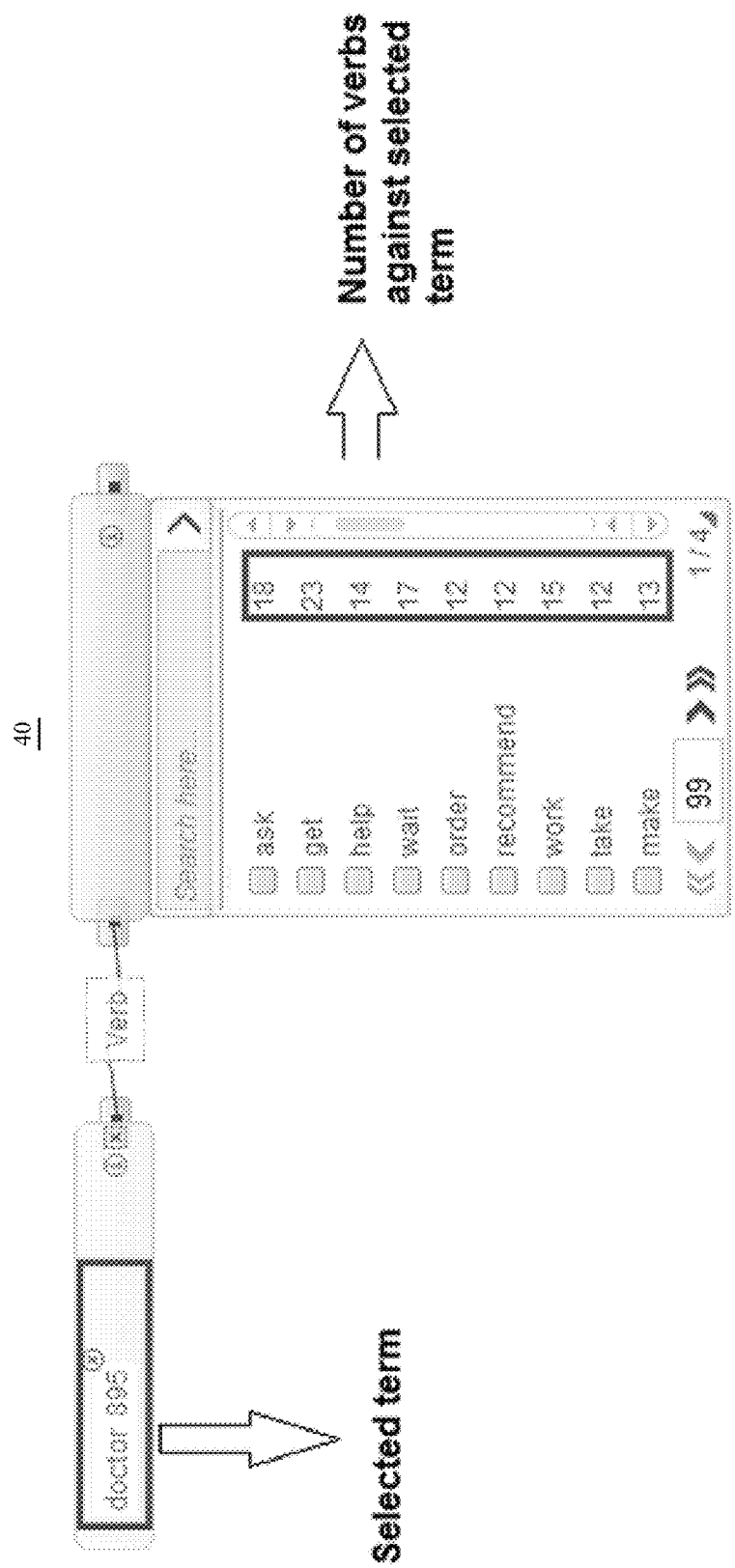
Figure 12D:
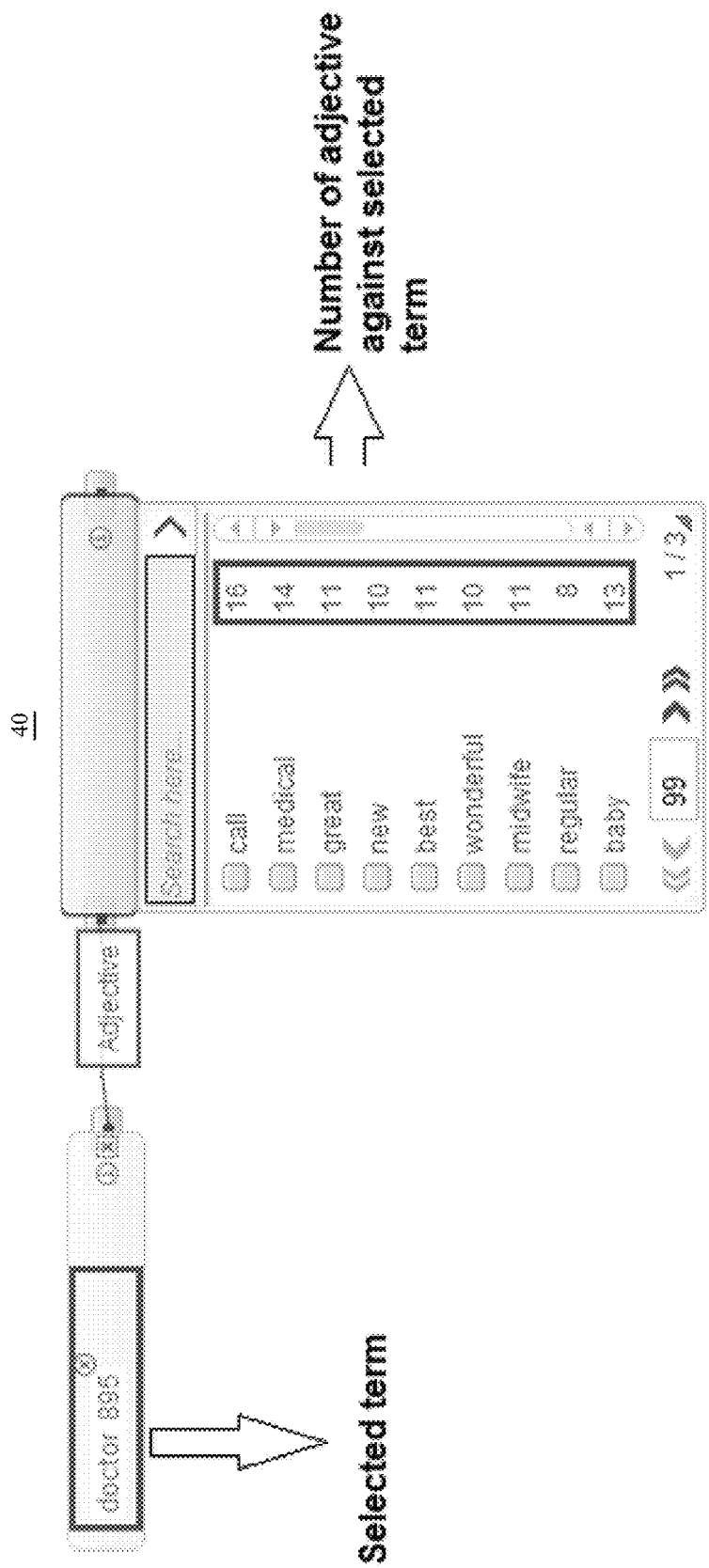
Figure 12E:
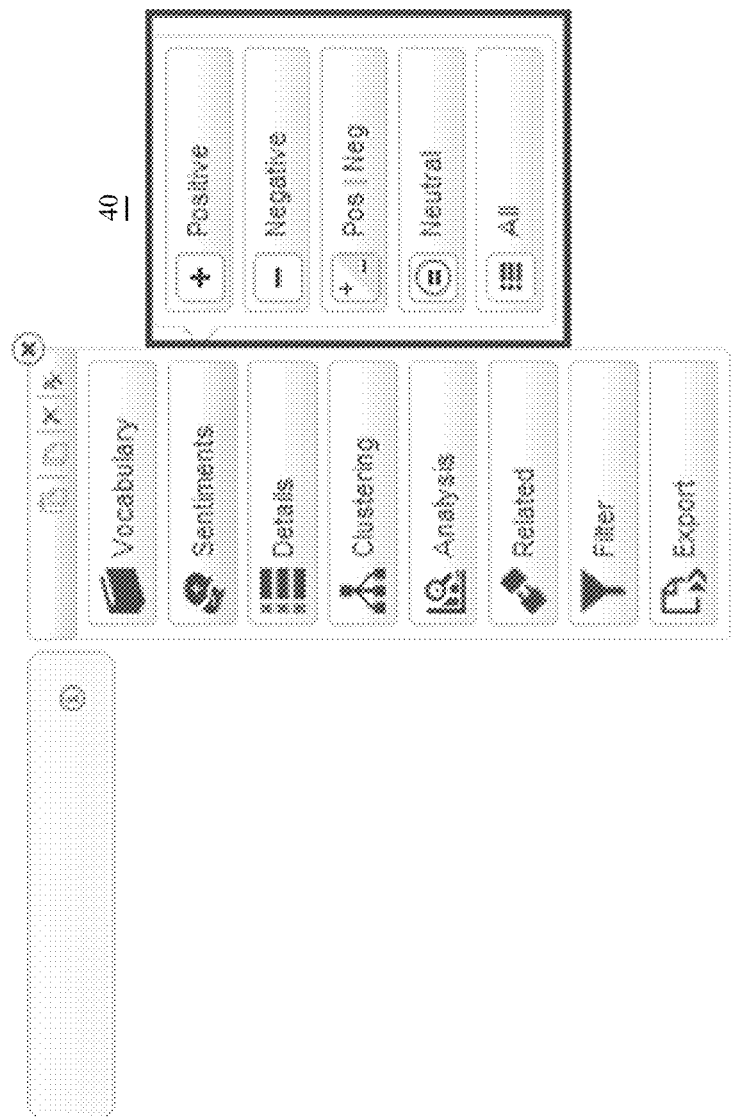
Figure 12F:
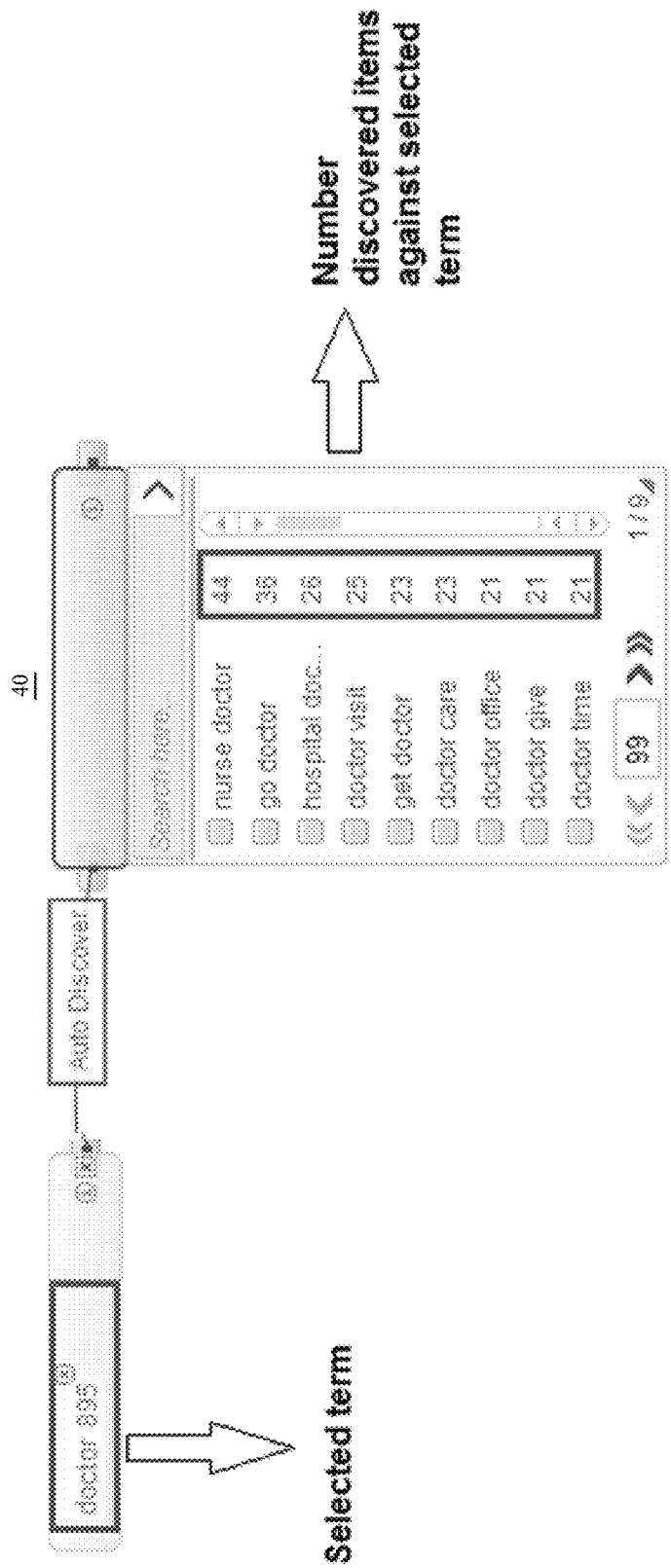

FIG. 12a illustrates a keyword selector 40 which displays a full list of extracted words to the user. The keyword selectors 40 may order the extracted list by word frequency or otherwise order the list. The keyword selector 40 may reduce the extracted words. For example, articles may be removed. In other configurations, the keyword selector 40 may select extracted words by part of speech. FIG. 12b illustrates a keyword selector 40 which displays a list of extracted nouns to the user. FIG. 12c illustrates a keyword selector 40 which displays a list of extracted verbs to the user. FIG. 12d illustrates a keyword selector 40 which displays a list of extracted adjectives to the user. As disclosed above, a data block 17 can have an associated assigned sentiment value such as positive, neutral, or negative. FIG. 12e illustrates a keyword selector 40 which displays a list of sentiment values to the user. In other configurations, the keyword selector 40 presents a list of words based on other selection criteria. FIG. 12f illustrates a keyword selector 40 which displays list of extracted words by comparison of the word pairs of the keyword of the current node combined the other words extracted from the data blocks. Word pairs above a threshold frequency of use in the language or word context are displayed.

Figure 13:
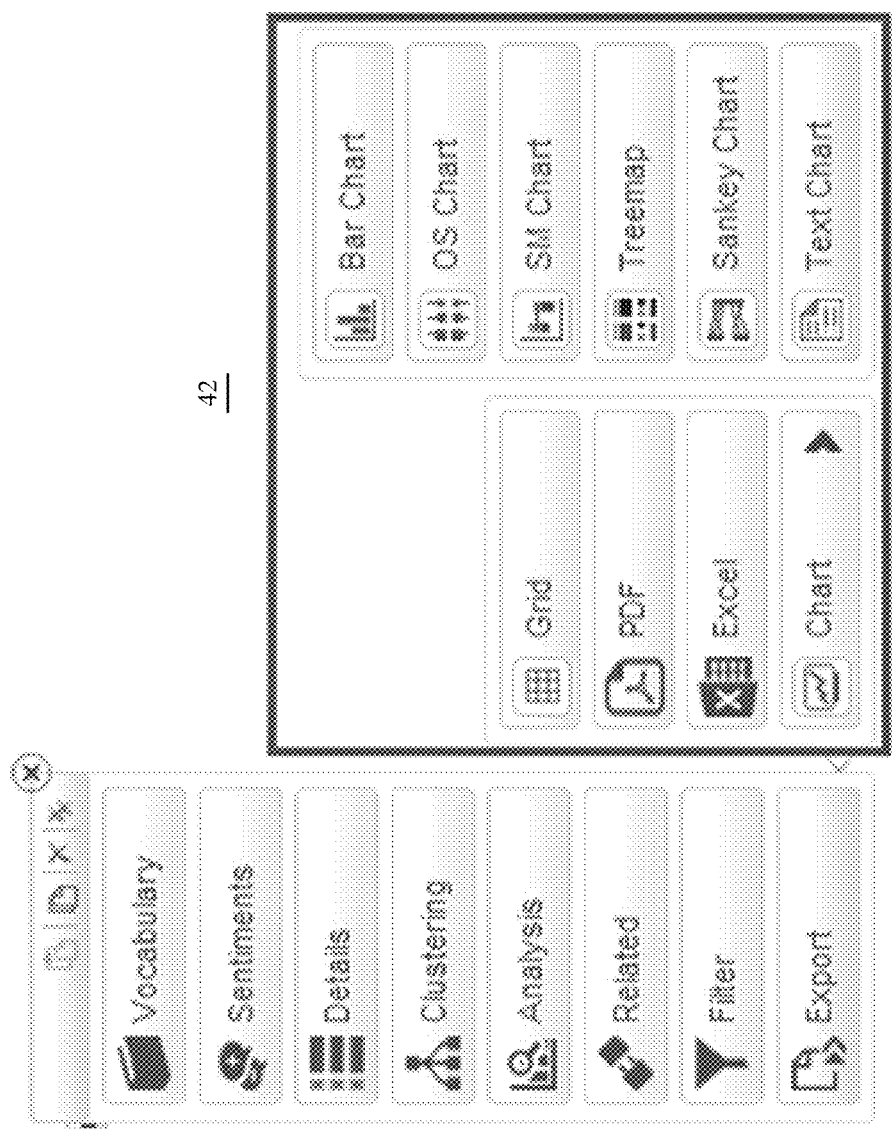
FIG. 13 show representative report selectors options of the report module.

At step 530, report selectors 42 are associated with the subject node 34. FIG. 13 displays a representative configurations of a report selector 42 of the current embodiment. The report selector 42 is an interface to facilitate user selection of reports 36 based on the subject node 34. The illustrated figure displays bar chart, ordered squares chart, matrix chart, tree map chart, Sankey chart, and text chart options.

Figure 14A:
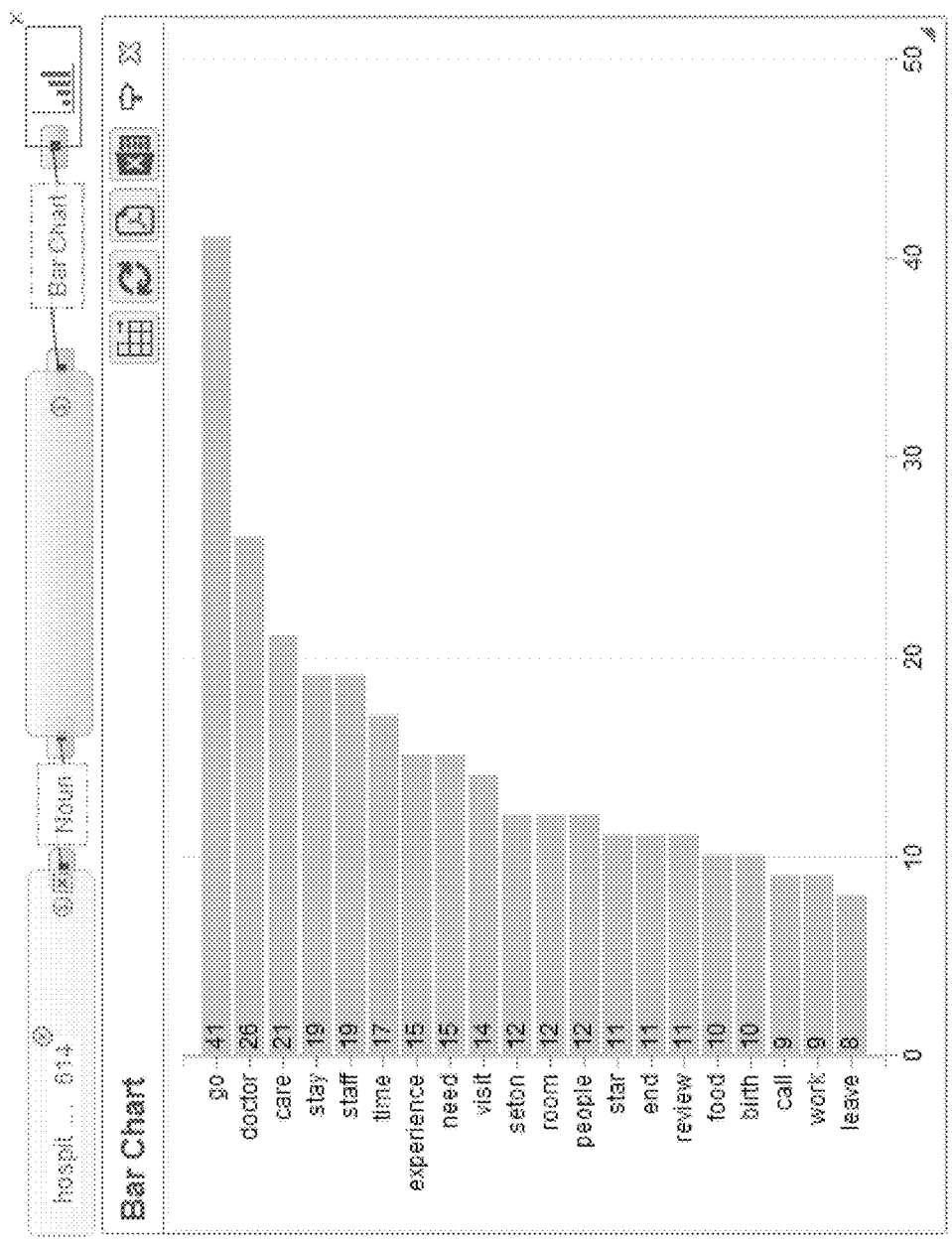
FIGS. 14a-f show a representative output reports of the report module.
Figure 14B:
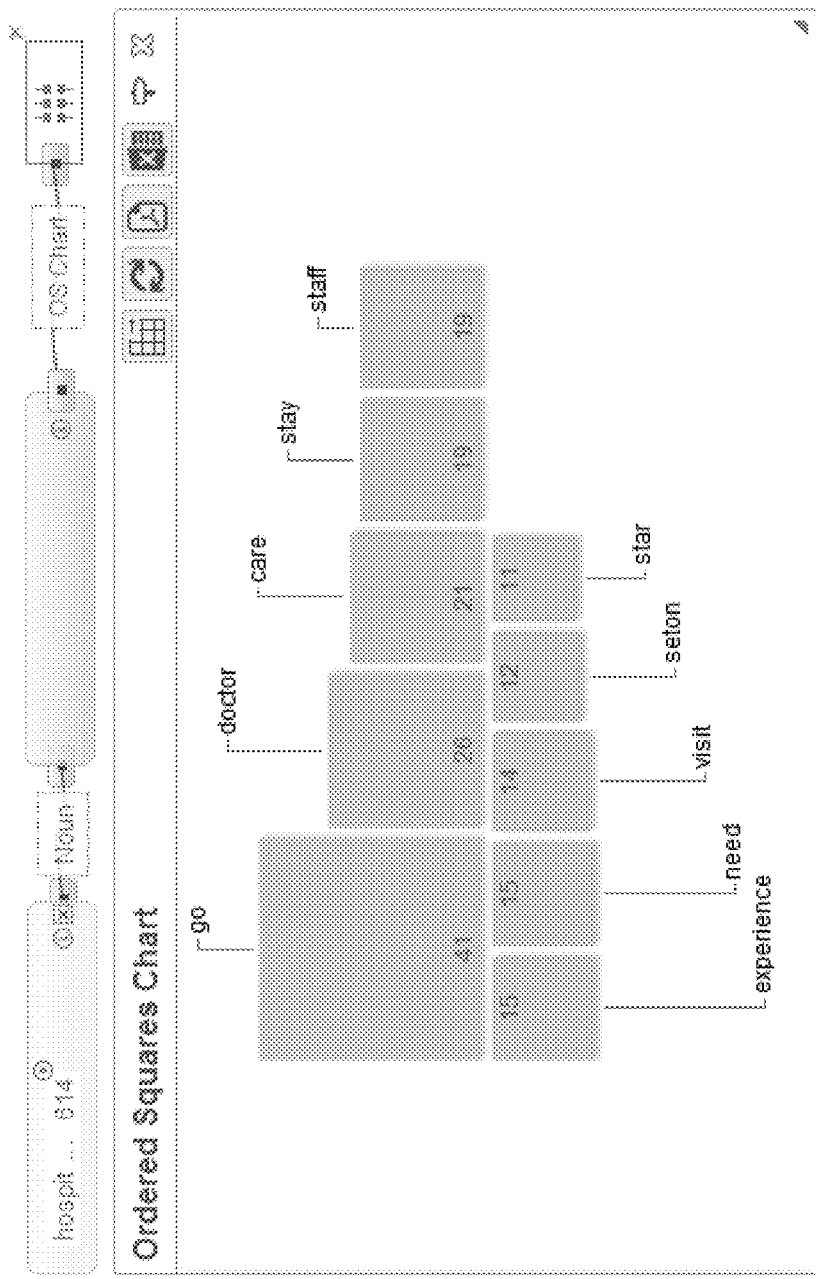
Figure 14C:
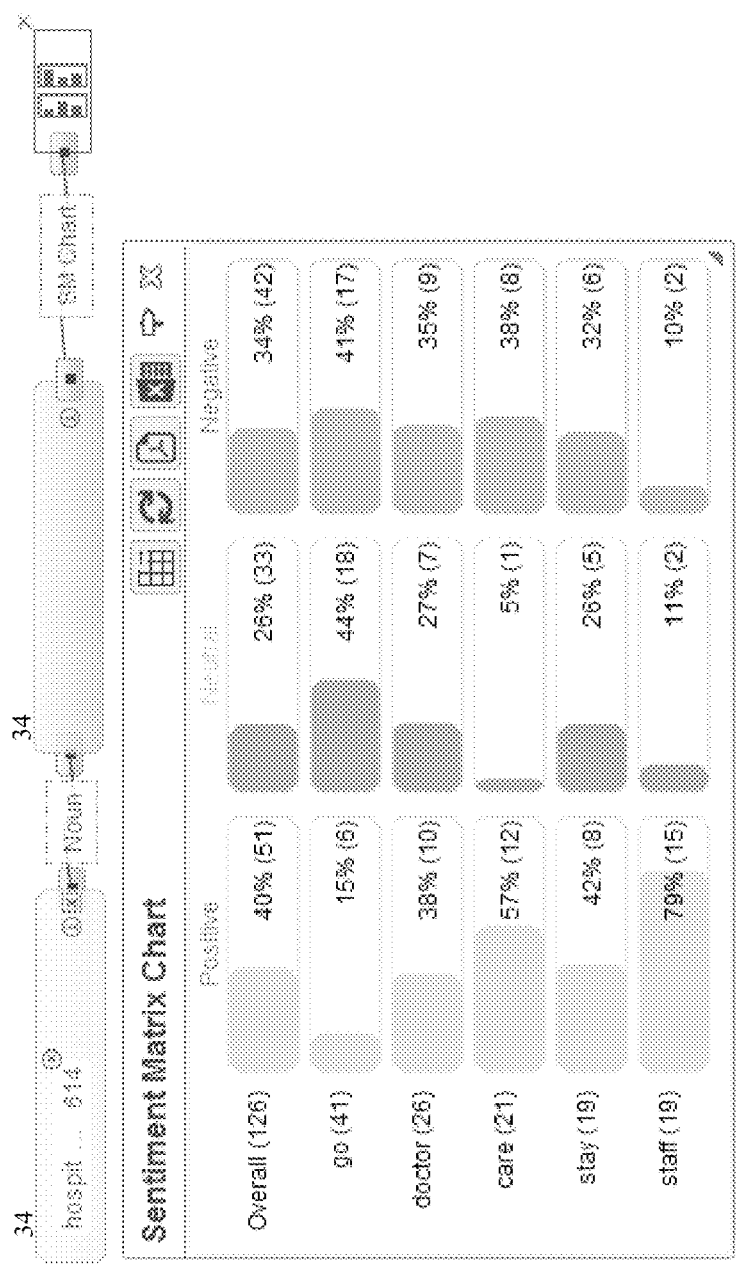
Figure 14D:
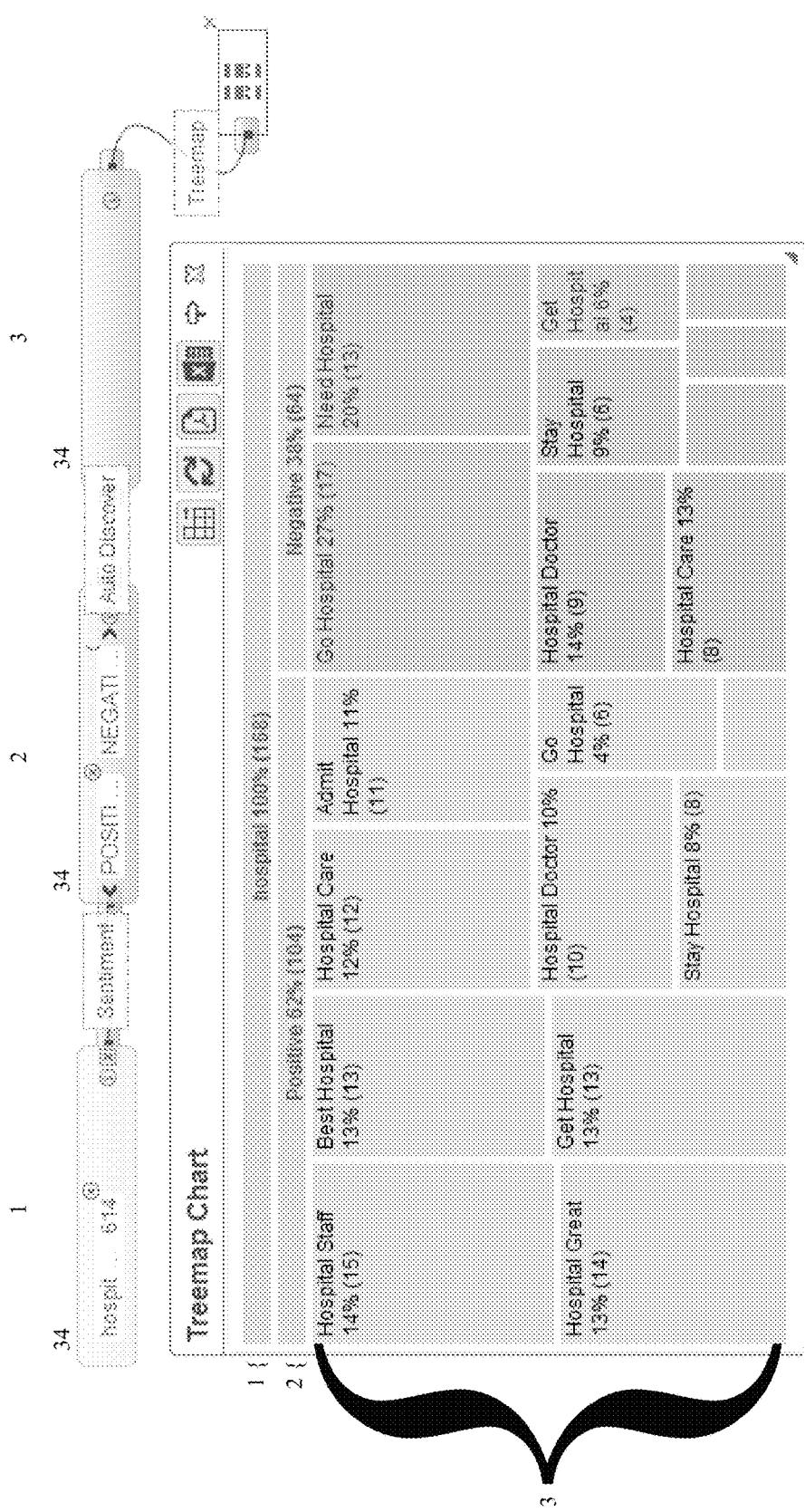
Figure 14E:
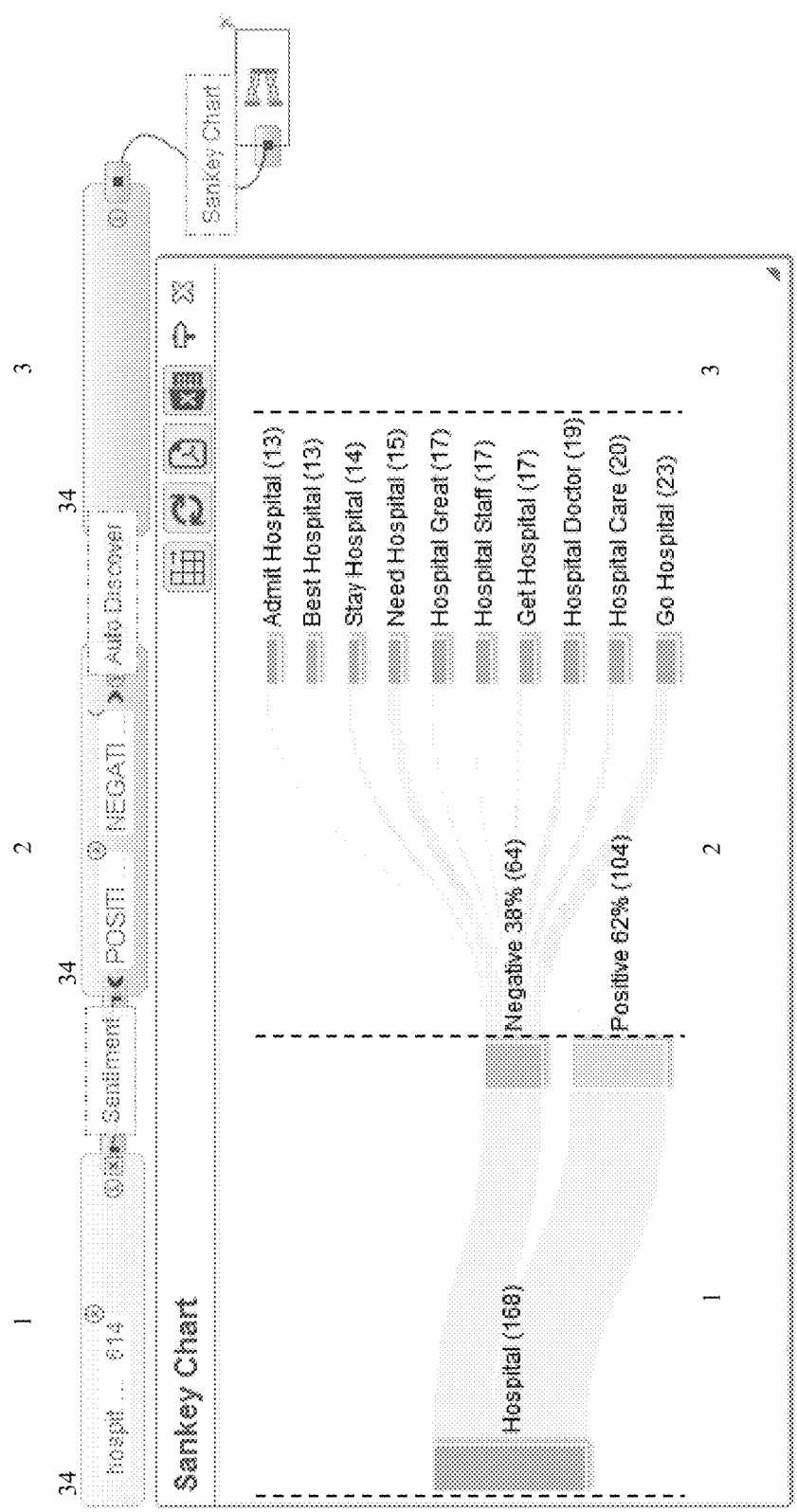
Figure 14F:
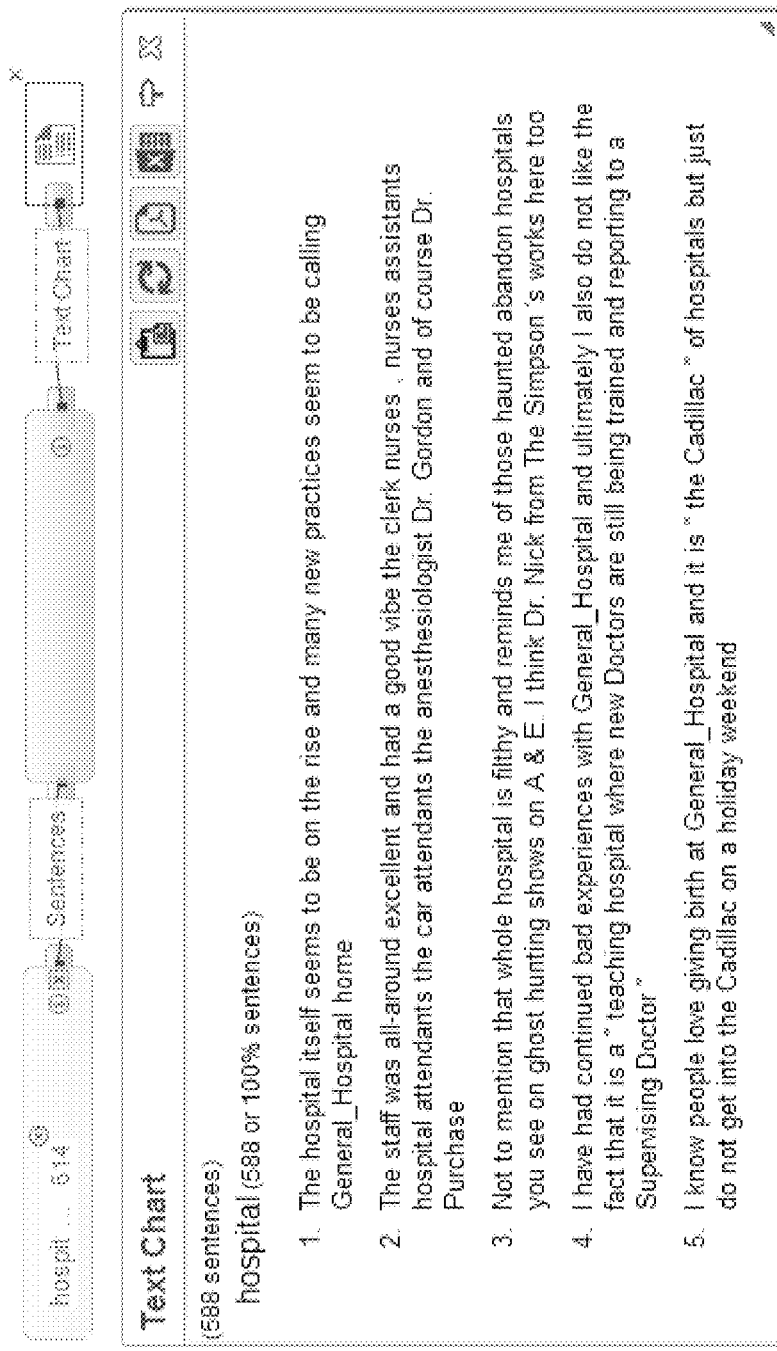

At step 540, the keyword selectors 40 and the reports selectors 42 are presented to the user. The user input is stored. Where the user selects a word from the keyword selector 40, that keyword a child node 34 is displayed based on that selected keyword 510, the taxonomy is updated based on based on the additional level 520, keyword selectors 40 and report selectors 42 are associated with the subject node 530, where the report module 30 will again act in response to navigation input 540.

Where the user selects a report 36 from the report selector 42, a report 36 based on the subject node 34, including the represented data blocks 17 and the level in the taxonomy is generated. FIG. 14a illustrates a bar chart 36, a chart with bars with lengths proportional to the values that they represent. The illustrated bar chart 36 visualizes the extracted words from the data blocks 17 of the current level, along with their corresponding frequency. FIG. 14b illustrates an ordered squares chart 36, a chart which displays data points in ordered way according to their weighting. Data points with high weight appears first and then lower weight data points. The illustrated order squares chart 36 visualizes the extracted words from the data blocks 17 of the current level, along with their corresponding frequency. FIG. 14c illustrates a matrix chart 36, a chart which displays has stacked columns or bars with the column widths or bar heights proportional to the other. The illustrated matrix chart 36 visualizes extracted nouns from the data blocks 17 of the current level, along with proportions of positive, neutral, or negative sentiment value. FIG. 14d illustrates a tree map chart 36, a chart which is a visual representation of a data tree, where each node is displayed as a rectangle, sized according to assigned. The illustrated tree map chart 36 visualizes a keyword at level one, a sentiment value at level two, and additional keywords at the third level. FIG. 14e illustrates a Sankey chart 36, a chart which is essentially a flow graph, starting with a top node and descending nodes shown proportionally smaller according to the flow quantity. The illustrated Sankey chart 36 visualizes a keyword at level one, a sentiment value at level two, and additional keywords at the third level. FIG. 14f illustrates a text chart 36, a chart displays a series of text elements. The illustrated text chart 36 visualizes the raw text of the data blocks 17 of the current level.

Figure 5:
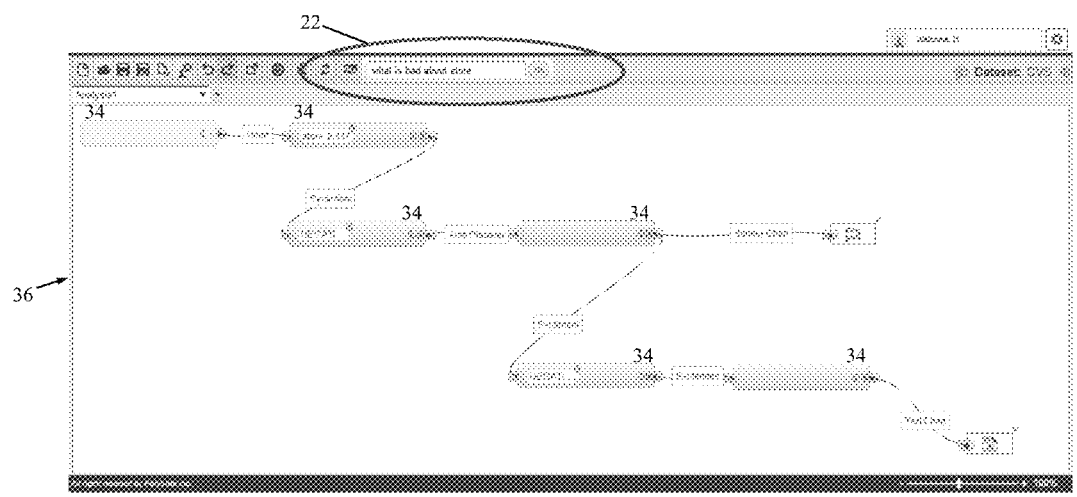
FIG. 5 shows a representative query input and a resulting plurality of related nodes.

In alternate configuration, the report module 30 presents an interface an input query 22 from a user and generates a node 34 family for presentation to the user for interaction as disclosed above. FIG. 5 illustrates a representative input query 22 and output node 34 family. The report module 30 receives a natural language input query 22. The report module 30 performs natural language processing, as disclosed above, on the input query 22. In exemplary configuration, the report module 30 assign part-of-speech tags and sentiment values. The input is further ordered and ranked by comparison of words in the input query 22 with words in the data blocks 17 of the structured data 18. Meaningful keywords from the input query 22 are selected. An association rule mining algorithm is applied to identified keywords to group them based on whether they are related and follow the same path or branch in nodes 34 or unrelated keyword and have separate path or branch. An association value among keyword group within the input query 22 is assigned. Where the keyword pairs are above a threshold association value, they are assigned a parent child relationship. After the keywords are grouped, each keyword group may be associated with a sentiment value based on input query 22. For example, the input query "What is good about customer service and bad about food?" Two keywords groups "customer service" and "food" are identified. The group "customer service" is assigned a positive sentiment and group "food" is assigned negative sentiment. The report module 30 applies a data tree structure of n levels as disclosed above, where the lower ranking keywords are descendants to higher ranking keywords. Each keyword is treated as a node 34 as disclosed above. The root node 34 represents the data blocks 17 containing the root keyword. The intermediate nodes 34 are objects representing the data blocks 17 of the parent further restricted by keyword or associated values of descendants. The intermediate nodes 34 are linked as a parent to one or more intermediate nodes 34 or terminal nodes 34. The node 34 family is displayed for interaction as disclosed above. Keyword selectors 40 and report selectors 42 are associated with the subject node 34 for revisions or further interaction with the node 34 family.

Figure 9:
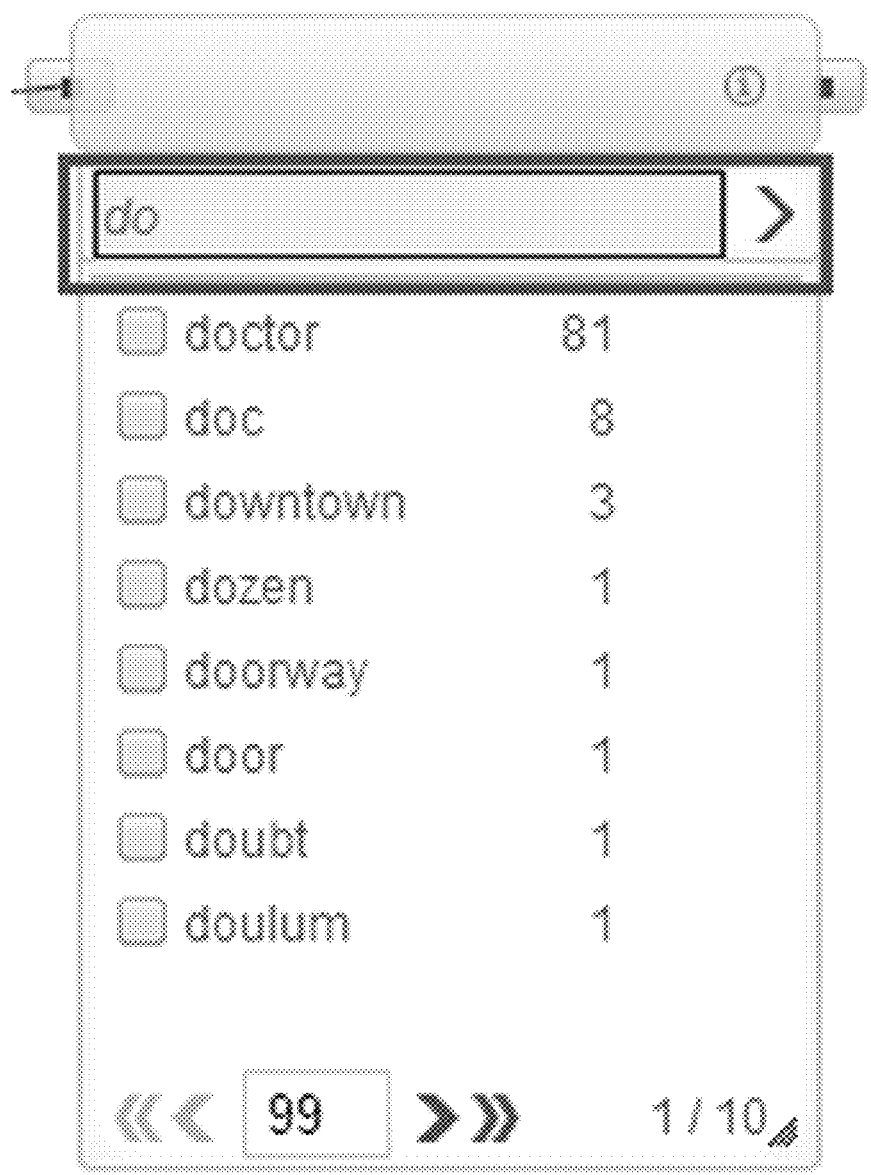
FIG. 9 shows a representative interface of the report module for root concept selection.
Figure 15A:
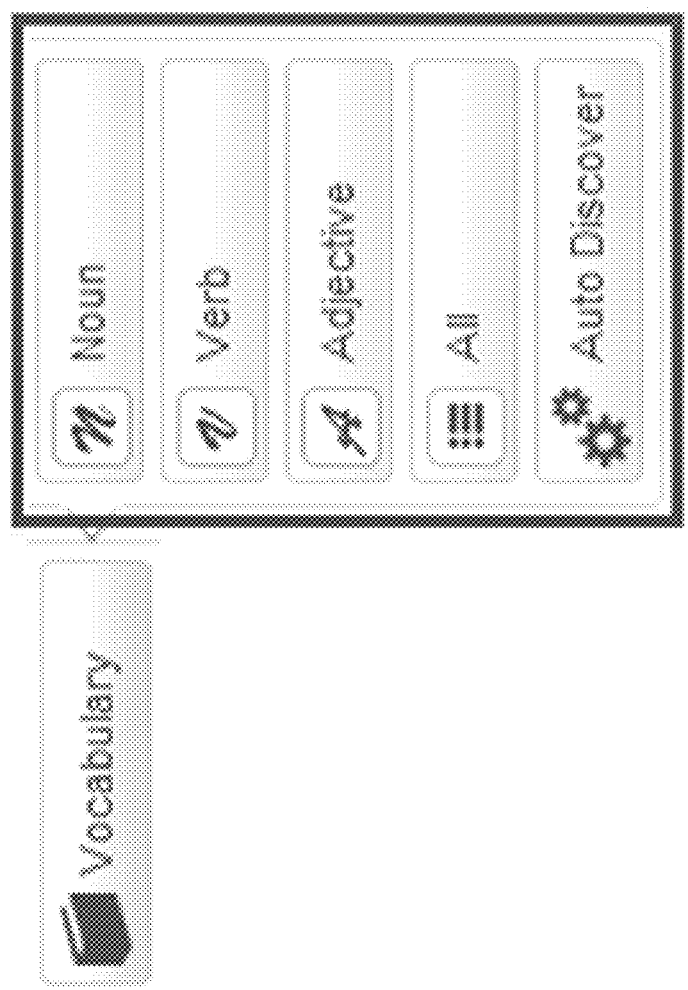
FIGS. 15a-b show a representative keyword selectors and report options of the report module.
Figure 15B:
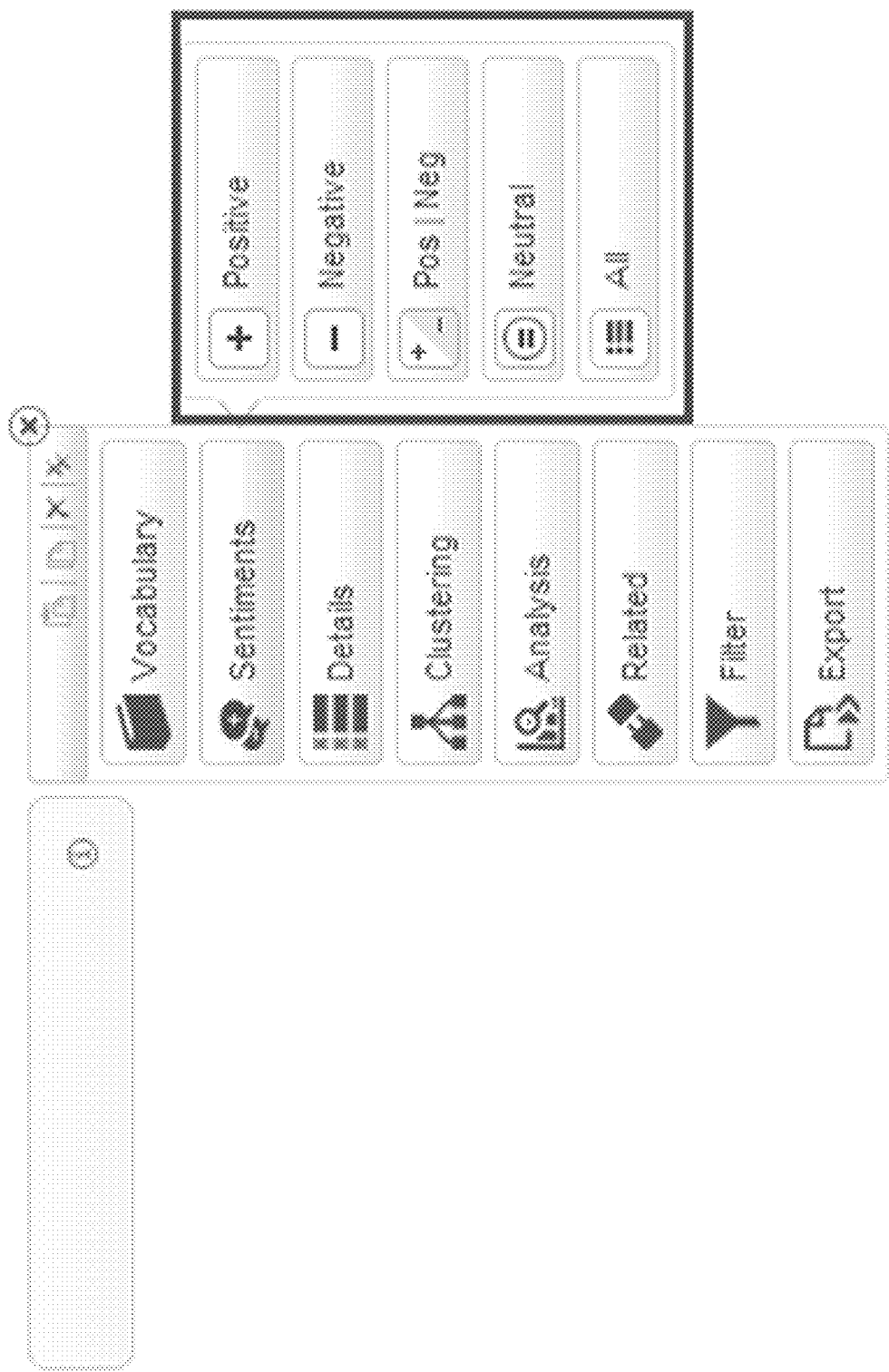

Now that major elements of the system have 10 been disclosed, exemplary use of the system is disclosed, primarily shown in FIG. 2. Initially, the user select a data source 100. The system 10 and retrieves unstructured data 16 over the network 15 in response to the selection 200. The system 10 converts the unstructured data 16 to structured data 300. Optionally, the user applies a data filter to the structured data 400, further narrowing the dataset. The report module 30 presents the report interface 500. The user inputs an initial keyword for analysis (FIG. 9). The report module 30 displays a root node 34 for user interaction (FIG. 10). The report module 30 presents options for keyword selectors 40 (FIGS. 15a-b) or report selectors (FIG. 13). If the user requests keyword selectors 40, the selected keyword selector 40 is displayed and additional keywords are selected (FIGS. 12a-g). The report module 30 displayed an updated canvas with the additional descendant node 34 (FIG. 10) for further interaction. If the user requests report selection 42, the report type is selected, the report 36 is generated, and displayed (FIGS. 14a-f).

Insofar as the description above and the accompanying drawing disclose any additional subject matter that is not within the scope of the single claim below, the inventions are not dedicated to the public and the right to file one or more applications to claim such additional inventions is reserved.

What is claimed is:

1. A system for natural language query and reporting comprising:

a processor and memory;

a query interface configured for receipt of a data source selection;

said processor configured to search and retrieve remote over a network unstructured data based on the received data source selection, parse unstructured data into data blocks and store said data blocks in a local database;

said processor configured to semantically parse said data blocks, including part of speech tagging, and store resulting data in a structured database;

a report module configured to:

receive a natural language query;

semantically parse said natural language query, including part of speech tagging;

order and rank by comparison of keywords in the natural language query with words in the data blocks of the structured data;

assigning an association value among keywords within said natural query;

creating a taxonomy of keywords of said natural language query, where the keyword groups of above a threshold association value are assigned a parent child relationship;

creating a node family of the same structure as said taxonomy, each of said nodes representing a subset of data blocks of said structured database having the respective keyword;

associating a keyword selector with said subject node, said keyword selector presenting an interface for additional user keyword input;

associate a report selector with said subject node, said report selector configured to receive a report type and a node and generate a report based on data blocks associated with said node.

2. The system of claim 1, wherein said processor is further configured to assign sentiment values to said data blocks.

3. The system of claim 1, wherein said keyword selectors comprises a lists of words of a single part of speech, said part of speech selected from nouns, verbs, and adjectives.

4. The system of claim 1, wherein said report types include are selected from the following: bar chart, order squares chart, matrix chart, tree map chart, sankey chart, text chart.

5. The system of claim 1, wherein said keyword selector comprises a list of sentiment values.

* * * * *